US012810126B2

(12) United States Patent
Shen et al.

(10) Patent No.: US 12,810,126 B2
(45) Date of Patent: Nov. 24, 2026

(54) SYSTEM AND METHOD FOR HYPERDIMENSIONAL COMPUTING (HDC) FOR ACTIVATION MAP ANALYSIS (AMA)

(71) Applicant: Leidos, Inc., Reston, VA (US)

(72) Inventors: Weicheng Shen, Vienna, VA (US); Roopa M. Vasan, Rockville, MD (US); Victor M. Miranda, Sylmar, CA (US)

(73) Assignee: Leidos, Inc., Reston, VA (US)

( * ) Notice: Subject to any disclaimer, the term of this patent is extended or adjusted under 35 U.S.C. 154(b) by 1207 days.

(21) Appl. No.: 17/825,948

(22) Filed: May 26, 2022

(65) Prior Publication Data

US 2023/0114388 A1 Apr. 13, 2023

Related U.S. Application Data

(60) Provisional application No. 63/254,758, filed on Oct. 12, 2021.

(51) Int. Cl.

| | |
|---|---|
| ***G06N 3/048*** | (2023.01) |
| ***G06V 10/74*** | (2022.01) |
| ***G06V 10/77*** | (2022.01) |
| ***G06V 10/774*** | (2022.01) |
| ***G06V 10/776*** | (2022.01) |
| ***G06V 10/82*** | (2022.01) |

(52) U.S. Cl.

CPC ........... *G06N 3/048* (2023.01); *G06V 10/761* (2022.01); *G06V 10/7715* (2022.01); *G06V 10/774* (2022.01); *G06V 10/776* (2022.01); *G06V 10/82* (2022.01)

(58) Field of Classification Search

CPC ...... G06N 3/048; G06N 3/0464; G06N 3/047; G06N 3/09; G06N 5/045; G06V 10/761; G06V 10/7715; G06V 10/774; G06V 10/776; G06V 10/82

See application file for complete search history.

(56) References Cited

PUBLICATIONS

Papernot ("Deep k-Nearest Neighbors: Towards Confident, Interpretable and Robust Deep Learning" Mar. 13, 2018) arXiv:1803.04765v1 [cs.LG] Mar. 13, 2018 (Year: 2018).*

Salamat ("F5-HD: Fast Flexible FPGA-based Framework for Refreshing Hyperdimensional Computing" Feb. 24, 2019) FPGA '19, Feb. 24-26, 2019, Seaside, CA, USA (Year: 2019).*

Moin ("A wearable biosensing system with in-sensor adaptive machine learning for hand gesture recognition" Dec. 21, 2020) Published: Dec. 21, 2020 Nature Electronics vol. 4, pp. 54-63 (2021) (Year: 2020).*

(Continued)

*Primary Examiner* — Usmaan Saeed
*Assistant Examiner* — Su-Ting Chuang
(74) *Attorney, Agent, or Firm* — Dawn-Marie Bey; Bey & Cotropia PLLC

(57) ABSTRACT

An Activation Map Analysis (AMA) system attaches to an existing deep neural network (host network) as an observer that analyzes the internal activities of the host network to provide additional information, e.g., metrics for resilience, interpretability, and adversarial defense, to the end-user. The AMA system is developed using deep k-nearest neighbor (DkNN) coupled with principal component analysis (PCA) for data dimensionality reduction or Hyperdimensional Computing (HDC) to encode activation map data of the host for data reduction.

16 Claims, 31 Drawing Sheets

(56) References Cited

PUBLICATIONS

Kussul ("Permutation Coding Technique for Image Recognition Systems" Nov. 30, 2006) Published in: IEEE Transactions on Neural Networks ( vol. 17, Issue: 6, Nov. 2006) (Year: 2006).*
Manabat ("Performance Analysis of Hyperdimensional Computing for Character Recognition" Aug. 19, 2019) Published in: 2019 International Symposium on Multimedia and Communication Technology (ISMAC) (Year: 2019).*
Andoni ("Practical and Optimal LSH for Angular Distance" Sep. 9, 2015) Advances in Neural Information Processing Systems 28 (NIPS 2015) (Year: 2015).*
Perez ("Improving the Accuracy of Convolutional Neural Networks by Identifying and Removing Outlier Images in Datasets Using t-SNE" Apr. 27, 2020) Mathematics 2020, 8, 662; doi:10.3390/math8050662 (Year: 2020).*
Arrieta, et al., "Explainable Artificial Intelligence (XAI): Concepts, taxonomies, opportunities and challenges toward responsible AI," Information Fusion 58 (2020), pp. 82-118.
Papernot, et al., "Deep k-Nearest Neighbors: Towards Confident, Interpretable and Robust Deep Learning," arXiv:1803.04765v1 [csLG], Mar. 13, 2018.
Kanerva, P., "Hyperdimensional Computing: an Introduction to Computing in Distributed Representation with High-Dimensional Random Vectors," Cognitive Computation, vol. 1, No. 2, Jun. 2009.
Timothy J. O'Shea, et al., "Convolutional Radio Modulation Recognition Networks," EANN (2016), arXiV: 1602.04105v3, Jun. 10, 2016.
Hervé Jégou, et al., "Aggregating local descriptors into a compact image representation," 2010 IEEE Computer Society Conference on Computer Vision and Pattern Recognition, 20910, pp. 3304-3311, doi: 10.1109/CVPR.2010.5540039.

* cited by examiner layer_f5 w/SIFT layer_f5 layer_f6 layer_f7 layer_f8 layer_f9 f9 + f8 f9 + f8 + f7 f9 + f8 + f7 + f6 f9 + f8 + f7 + f6 + f5 f9 + f8 f9 + f8 + f7 f9 + f8 + f7 + f6 f9 + f8 + f7 + f6 + f5

SYSTEM AND METHOD FOR HYPERDIMENSIONAL COMPUTING (HDC) FOR ACTIVATION MAP ANALYSIS (AMA)

CROSS-REFERENCE TO RELATED APPLICATIONS

The present application claims benefit of priority to U.S. Provisional Patent Application No. 63/254,758, entitled "SYSTEM AND METHOD FOR HYPERDIMENSIONAL COMPUTING (HDC) FOR ACTIVATION MAP ANALYSIS (AMA)," filed Oct. 12, 2021, the entirety of which is incorporated herein by reference.

BACKGROUND

Technical Field

The general field is artificial intelligence methods using deep learning. More specifically, the embodiments address the ability to explain DNN model decisions, which are particularly relevant to decision-making in key areas such as imaging and detection.

Description of Related Art

Artificial Intelligence (AI) methods can achieve incredible performance when learning to solve increasingly complex computational problems in many areas impacting human society. The current and future AI-powered systems are so sophisticated that many require almost no human intervention on how these systems arrive at their decisions, e.g., Deep Learning (DL) models such as Deep Neural Networks (DNN) comprised of many layers and parameters. How these systems arrive at their decision is becoming less transparent or more black-box like which becomes a barrier to the usefulness and acceptance of AI systems. This is especially true when the binary computed decisions directly impact human lives, such as in medicine, law, defense/security, transportation, and banking.

State-of-the-art Convolutional Neural Network (CNN) models provide a gold standard for AI-systems in performing computer vision tasks, such as image classification, object detection, semantic segmentation, and instance segmentation. By way of example, CNN neural net activation map-based techniques have been research alongside other attribution-based network approaches to enhance the resilience, interpretability, and adversarial attack defense in the underlying deep learning decision making process, e.g., deep k-nearest neighbors. For a detailed description of various historical approaches to explaining AI, including activation map-based techniques, see the article by Arrieta et al., Explainable Artificial Intelligence (XAI): Concepts, taxonomies, opportunities and challenges toward responsible AI, Information Fusion 58 (2020) pages 82-118, which is incorporated herein by reference for all of its teachings. However, such research provides a proof of concept and does not address the real-world application of such capability.

Accordingly, before we can practically apply AI methods, there is a need for understanding how such decisions are made. The ability to explain DNN model decisions, which are particularly relevant to decision-making in key areas such as imaging and detection, is needed.

SUMMARY OF THE EMBODIMENTS

In a first non-limiting embodiment, a process for explaining deep neural network (DNN) decisions includes: attaching an activation map analysis (AMA) system to the DNN for employing a calibration process and an inferencing process, wherein the calibration process includes: feeding the DNN a calibration dataset (C), extracting, by an extraction module of the AMA system, baseline activation maps at each layer of the DNN for the calibration dataset, wherein the baseline activation maps are stored as activation map vectors, reducing dimensionality of the activation map vectors using a dimensionality reduction process, calculating a calibration non-conformity for each element of the calibration dataset to determine a calibration non-conformity dataset (A); and the inferencing process includes: feeding the DNN a query input (z) of dataset (Q), extracting, by an extraction module of the AMA system, query activation maps at each layer of the DNN for the query dataset, wherein the query activation maps are stored as activation map vectors, calculating a query non-conformity for each element of the query dataset to determine a query non-conformity dataset (B); and calculating by a specified-metric module a fraction value of the calibration non-conformity dataset that have higher non-conformity than a threshold established by the query non-conformity dataset, wherein the fraction value is used to determine at least one of a credibility score CS(z), a prediction label PL(z) and confidence CF(z) in one or more of the DNN decisions.

In a second non-limiting embodiment, a process for determining DNN decision credibility includes: attaching an activation map analysis (AMA) system to the DNN for employing a calibration process and an inferencing process, wherein the calibration process includes: feeding the DNN a calibration dataset (C), extracting, by an extraction module of the AMA system, baseline activation maps of at least one layer of the DNN for the calibration dataset, encoding the baseline activation maps using one or more binary HDC component vectors to generate at least one calibration hypervector, calculating a calibration non-conformity for each element of the calibration dataset, including the at least one calibration hypervector, to determine a calibration non-conformity dataset (A); and the inferencing process includes: feeding the DNN a query input (z) of dataset (Q), extracting, by an extraction module of the AMA system, query activation maps of at least one layer of the DNN for the query dataset, encoding the query activation maps using one or more binary HDC component vectors to generate at least one query hypervector, calculating a query non-conformity for each element of the query dataset, including the at least one query hypervector, to determine a query non-conformity dataset (B); and calculating by a specified-metric module a fraction value of the calibration non-conformity dataset that have higher non-conformity than a threshold established by the query non-conformity dataset, wherein the fraction value is used to determine a credibility score CS(z) for the DNN decision.

In a third non-limiting embodiment, a system for explaining deep neural network (DNN) decisions includes: a host network deploying a deep neural network (DNN); and an activation map analysis toolkit including an extraction module, a dimension reduction module and a non-conformity module; wherein the activation map analysis toolkit communicates with the host network to output use-case specific metrics which explain DNN decisions.

BRIEF SUMMARY OF THE FIGURES

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
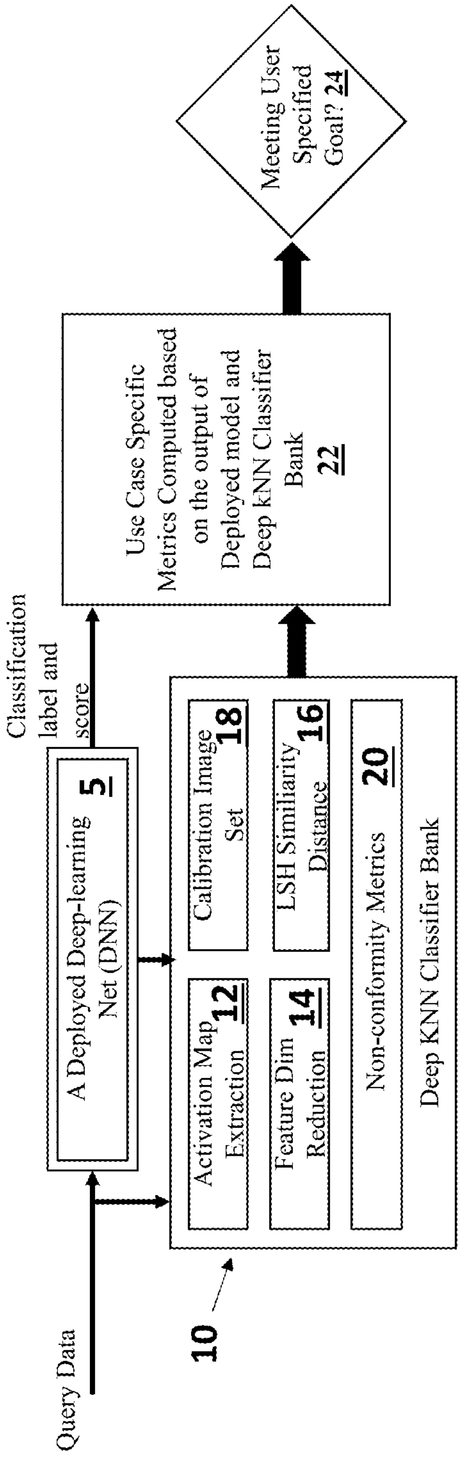
FIG. 1 exemplifies the Activation Map Analysis (AMA) system and process using deep k-nearest neighbor (DkNN) in accordance with embodiments herein.

Activation Map Analysis (AMA) provides a system of multiple components to mature the neural net activation map-based analysis for solving the real-world scaling problems in explainable artificial intelligence (XAI). The AMA system attaches to an existing deep neural network (host network) as an observer that analyzes the internal activities of the host network to provide additional information, e.g., metrics for resilience, interpretability, and adversarial defense, to the end-user. A first baseline embodiment of the AMA system for resilience is developed using deep k-nearest neighbor (DkNN) coupled with principal component analysis (PCA) for data dimensionality reduction. The DkNN algorithm is described in Papernot et al., Deep k-Nearest Neighbors: Towards Confident, Interpretable and Robust Deep Learning, arXiv:1803.04765v1 [cs.LG] 13 Mar. 2018 (hereafter "Papernot"), which is incorporated herein by reference in its entirety. The second embodiment of an improved AMA system described herein uses Hyperdimensional Computing (HDC) to encode activation map data of the host for data reduction, which replaces the PCA component in the first embodiment.

Originally described in Kanerva, P., "Hyperdimensional Computing: An Introduction to Computing in Distributed Representation with High-Dimensional Random Vectors." Cognitive Computation, vol. 1, no. 2, June 2009, HDC is a computational paradigm focused on mimicking the human brain's robustness, randomness, and holistic representation of information using high dimensional vectors (e.g., 10,000 elements) as stores of information, known as hyperdimensional vectors or "hypervectors". In AI systems, HDC encodes input data into hypervectors and performs all core computations in-memory. It retains previous information in the memory, and processes new information based on the data and scenarios stored in the memory. It mimics human brain activity by directly searching for similar neural activity patterns previously encountered, i.e., the nearest hypervectors in the memory closely associated with the new input data. Although it may seem counterintuitive using hypervectors, HDC can provide the benefits of a fast, lightweight, and efficient AI system for supervised learning tasks, especially on edge devices where there are restrictions on data storage and hardware resources. As the second embodiment of the AMA system, HDC replaces PCA and encodes the activation map data of the host network for data dimensionality reduction. With HDC, we can address two major weaknesses in using PCA within AMA that limits its scalability: 1) memory demand, and 2) online model updates. The PCA-based AMA requires a large PCA component matrix to be loaded into memory for AMA operations to take place, which limits its scalability. Furthermore, the PCA based AMA requires updating the PCA component matrix when the host network model is augmented with new classes, which limits its ability for online learning in edge applications. This application of HDC within AMA contrasts with the traditional application of HDC encoding; that is, HDC encoding is traditionally used to encode the input feature space of data, e.g., the raw pixel values of an image. In contrast, HDC within AMA is used to encode, for the purposes of data aggregation and dimensionality reduction, the complex feature space of the activation map data that is a result of passing the input image through the host network.

As described further herein, the following HDC encoding schemes have been developed: 1) each activation map in a single layer of the host network is encoded as a hypervector, 2) the hypervectors representing every activation map in a single layer of the host network are bundled into a single hypervector, and 3) all activation maps in all layers of the host network are bundled into a single hypervector, which we call a meta-hypervector.

Based on the characteristics of the host network activation maps layers, the developed HDC encoding schemes may either 1) directly apply HDC to encode the raw pixel values, positions, and the layer indices of the activation maps for those layers with low spatial information and high semantic information, or 2) pre-process the activation maps to produce global image descriptors (GID) and apply HDC to encode the GID for those layers with high spatial information and low semantic information.

Accordingly, the improved AMA system using HDC provides a robust encoding of the complex activation map feature space, distilling a hypervector to each layer of the host CNN network with lower memory and faster speed.

Furthermore, the use of HDC within AMA maintains comparable performance as that from using PCA on the activation map data for dimensionality reduction (discussed further below). Additionally, HDC within AMA provides the conduit for additional detection and analytic processing, e.g., finding recurring anomalies for continuous learning and providing model interpretability as an input data sample progresses through the host network using hypervector representations.

In accordance with the embodiments herein, FIG. 1 exemplifies the AMA system and process using DkNN. An AMA toolkit 10 (also referred to as a DkNN classifier bank), communicates with a host network 5 which deploys a CNN, e.g., ResNet-101 CNN. The AMA toolkit 10 includes modules/code for activation map extraction 12, feature dimensionality reduction 14, LSH similarity distance determination 16, calibration image set 18, and non-conformity metrics 20. The output from host network 5, i.e., classification label and score, and outputs from AMA toolkit 10 are used to compute use case specific metrics 22. These use case specific metrics 22 are useful for detecting abnormal activation maps, detecting model drifting to improve model maintenance, detecting adversarial attack, and supporting XAI, i.e., explainability and interpretability. Based on the metrics from 22, the process is used to determine if the user specified goal is being met 24.

The systems and process are implemented on one or more processors, i.e., an Intel 8 core CPU, 256 GB RAM, and an NVIDIA Tesla T4 GPU with 16 GB VRAM. The AMA modules are implemented in Python using various libraries, i.e., NumPy, Scikit-Learn, Scikit-Image, and OpenCV, the host networks may be implemented in PyTorch or TensorFlow/Keras, and the HDC encoding schemes are implemented using CuPy, a GPU/CUDA implementation of NumPy.

Figure 2:
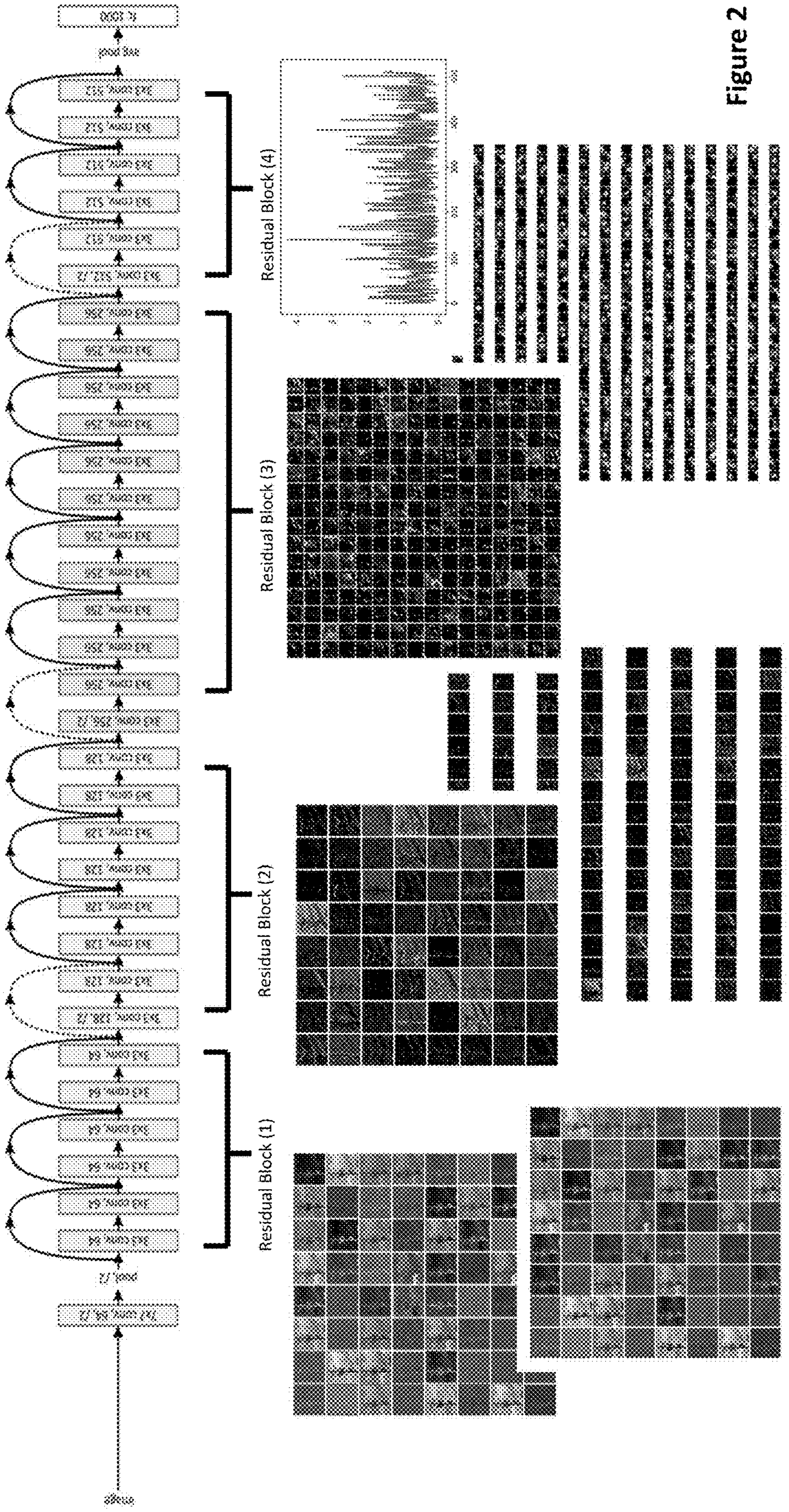
FIG. 2 provides an exemplary schematic of activation maps generated from the ResNet-101 CNN.

FIG. 2 provides an exemplary schematic of activation maps generated from the ResNetCNN. FIG. 2 shows exemplary activation maps comprised of map tiles, at different residual blocks as the input image passing through the CNN.

Figure 3A:
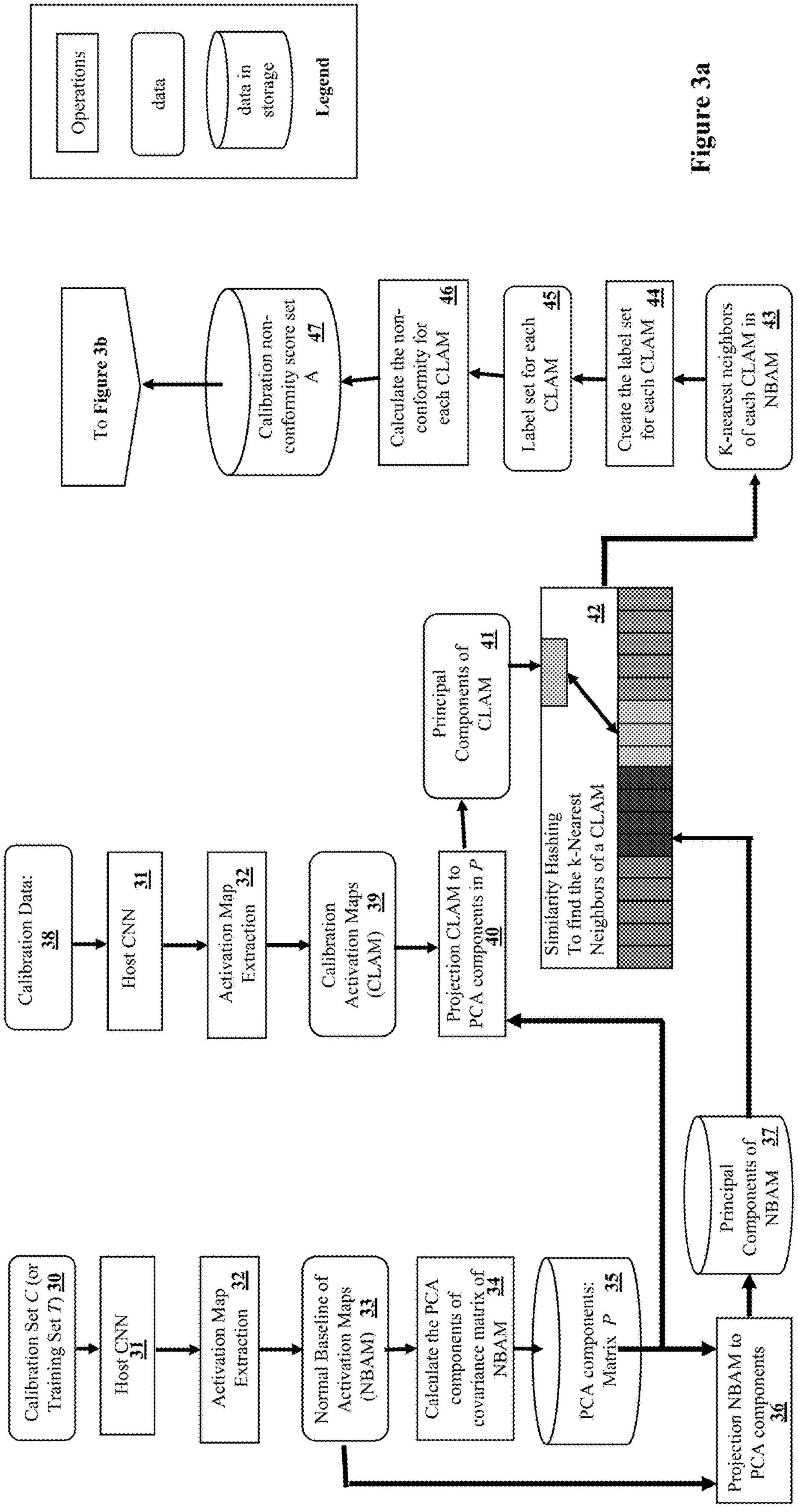
FIG. 3*a* exemplifies system for implementing the calibration phase of AMA process using PCA to reduce dimensionality of the layer activation maps for similarity determination in accordance with an embodiment herein.
Figure 3B:
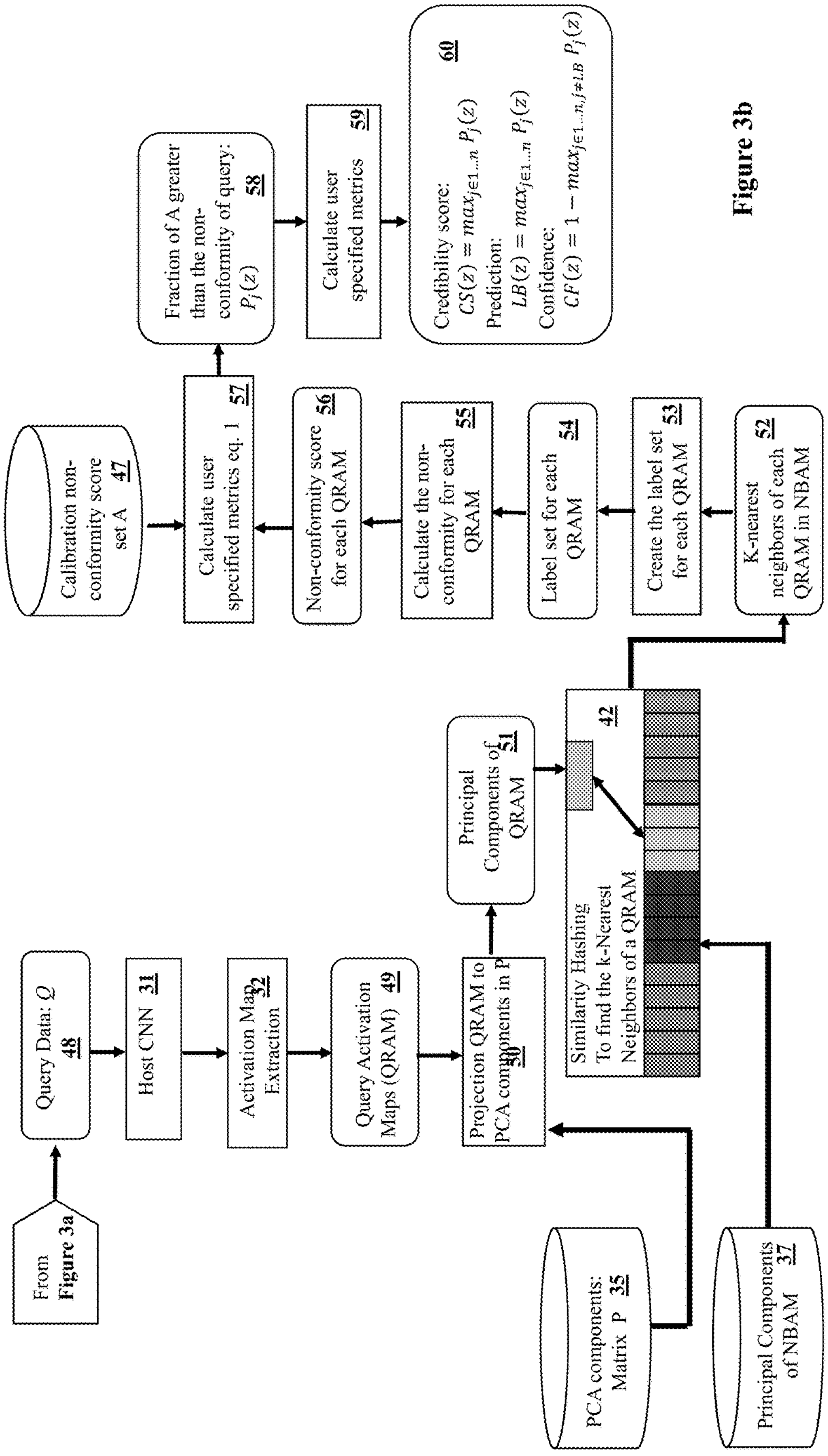
FIG. 3*b* exemplifies system for implementing the inferencing phase of AMA process query using PCA to reduce dimensionality of the layer activation maps for similarity determination in accordance with an embodiment herein.

In a first embodiment of AMA shown in FIGS. 3*a* and 3*b*, which uses PCA as a data reduction technique, there are two phases: calibration (FIG. 3*a*) and inferencing (FIG. 3*b*). In the calibration phase (FIG. 3*a*), we first build a "normal" baseline activation map (NBAM). The user provides a calibration dataset 30, C, that is in the same distribution as a dataset (T) used for training the host CNN model 31. Each element of $C=X\times Y$, is a 2-tuple, (x,y), $x\in X$ is the sample, and $y\in Y$ is its associated class label. The calibration data (or training data if available) is ingested into the host CNN 31, one at a time, and the activation maps at each layer of the host CNN 31 are captured by the Activation Map Extraction module 32. A "normal" baseline of activation maps 33 (NBAM) can then be built as a set of activation map vectors for each layer of the host CNN 31, where each activation map vector is formed by stacking the rasterized activation maps of an image from the calibration set 30. If the original training dataset T, is available, the normal baseline of the activation maps can be built using T as the input to host CNN 31 instead.

As each activation map vector in the NBAM normally has very large dimensions, data dimension reduction techniques are invoked to reduce the dimensionality of vectors in NBAM. In this first embodiment, Principal Component Analysis (PCA) is applied as a data reduction technique, 34. After applying the PCA to the NBAM 34, the components of the NBAM are obtained as P and they are stored in the files on hard drive storage 35. To reduce the dimension for NBAM, each activation map vector in NBAM is projected 36 to the space spanned by the first n principal components of NBAM 36, which forms the PCA representation for NBAM. The principal components of NBAM are stored in the files on hard drive storage 37.

Next, calculate the baseline non-conformity, which represents how well each element in C (or training set T) conforms with the baseline activation maps 33. This is a multistep process. The calibration dataset 38 in fed into the host CNN 31. The activation map extraction module 32 produces the calibration activation maps 39 (CLAM). With the CLAM 39 and PCA components 35 as inputs, the projection module 40 produces the principal components of CLAM 41. Next, using similarity hashing, find the K-nearest neighbor 42 of each element of CLAM 41 in the NBAM principal components 37 for each element of C, x: $\Gamma=\{$K-nearest neighbors of x in the normal baseline$\}$.

From the k-nearest neighbors found in 37 for each element of CLAM 41 which are stored in memory 43, create the label set 44 for x (a multi-set): $\Omega_\lambda=\{Y_i{:}i\in\Gamma\}$, where $\lambda$ is the layer index, and $Y_i$ is the class label for the i-th nearest neighbor. From the label sets stored in memory 45, calculate the calibration non-conformity 46: $a(x,y)=\Sigma_{\lambda\in 1\,\ldots\,l}|i\in\Omega_\lambda{:}\ i\neq y|$ for each element of C, and the non-conformity set of calibration dataset is $A=\{a(x,y){:}(x,y)\in C\}$. The calibration non-conformity score set A 47 is stored in the files on a hard drive.

The non-conformity set A serves as reference non-conformity pattern that the non-conformity of any other query input will be compared against to determine whether the query input is an in-distribution or out-distribution sample. If the query sample is out-distribution, then the host CNN output may not be trustworthy. Having built the foundations for deciding the trustworthiness of a CNN model prediction, we can proceed to the inferencing phase (FIG. 3*b*).

In the inferencing phase (FIG. 3*b*), to calculate the query data non-conformity, first feed the query input z of a query set Q into the host CNN model 31 to capture the query activation maps 49 (QRAM) by extraction module 32 while z passes through the host CNN model. This process is repeated for all elements in Q 48. In the inferencing phase, it assumes that the PCA components matrix P 35 and principal components of NBAM 37 are precalculated and can be readily retrieved for inferencing. With the QRAM 49 and PCA components 35 as inputs, the projection module 50 produces the n principal components of QRAM 51.

Next, find the K-nearest neighbors 42 for each element of principal components of QRAM 51 in the NBAM principal components 37 for each element of C, x: $\Gamma=\{$K-nearest neighbors of x in the normal baseline$\}$. The k-nearest neighbors found in 37 for each element of QRAM 51 are in the memory 52. Create the label set 53 for each x (a multi-set): $\Omega_\lambda=\{Y_i{:}i\in\Gamma\}$, where $\lambda$ is the layer index, and $Y_i$ is the class label for the i-th nearest neighbor. The label sets $\Omega_\lambda$ are in memory 54. Calculate the query non-conformity 55: $B=\{\alpha(z,j)=\Sigma_{\lambda\in 1\,\ldots\,l}|i\in\Omega_\lambda{:}i\neq y|{:}j\in 1\ \ldots\ n\}$ for each element of Q 48. The query non-conformity score dataset B 56 is in memory.

Once the non-conformity score of the QRAM 56 is available, and the non-conformity set of calibration set 47 $A=\{\alpha(x,y){:}(x,y)\in Q\}$ is retrieved, the module of user specified metrics 57 calculates the fraction of the A 58 that have higher non-conformity values than the threshold, $\alpha(z,j)\in B$, for each class j, $$P_j(z) = \frac{|\{\alpha \in A: \alpha \geq \alpha(z, j)\}|}{|A|} \quad (1)$$

It can be observed from the above equation that the larger a(z,j) is, the smaller non-conformity $P_j$ (z). In other words, higher non-conformity of the query sample leads to lower $P_j$ (z). Based on 58, the module of user specified metrics 59 calculates the credibility score (2), class label prediction (3), and prediction confidence (4), and the results are stored in memory 60. The credibility score, CS(z), is the trustworthiness of the prediction. The prediction label (PL(z)), confidence (CF(z)), and the credibility scores (CS(z)) are expressed as [Papernot et al., Deep k-Nearest Neighbors: Towards Confident, Interpretable and Robust Deep Learning, arXiv:1803.04765v1]:

$$CS(z) = \max_{j \in 1 \ldots n}\left(P_j(z) = \frac{|\{\alpha \in A: \alpha \geq \alpha(z, j)\}|}{|A|}\right) \quad (2)$$

$$PL(z) = \max_{j \in 1 \ldots n} P_j(z) \quad (3)$$

$$CF(z) = 1 - \max_{j \in 1 \ldots n, j \neq LB} P_j(z) \quad (4)$$

The data reduction part of the first embodiment of AMA requires the calculation of the PCA components of the covariance matrix of NBAM, which has very large memory requirements and has limited utility when applied to real-world host CNN network.

Figure 4A:
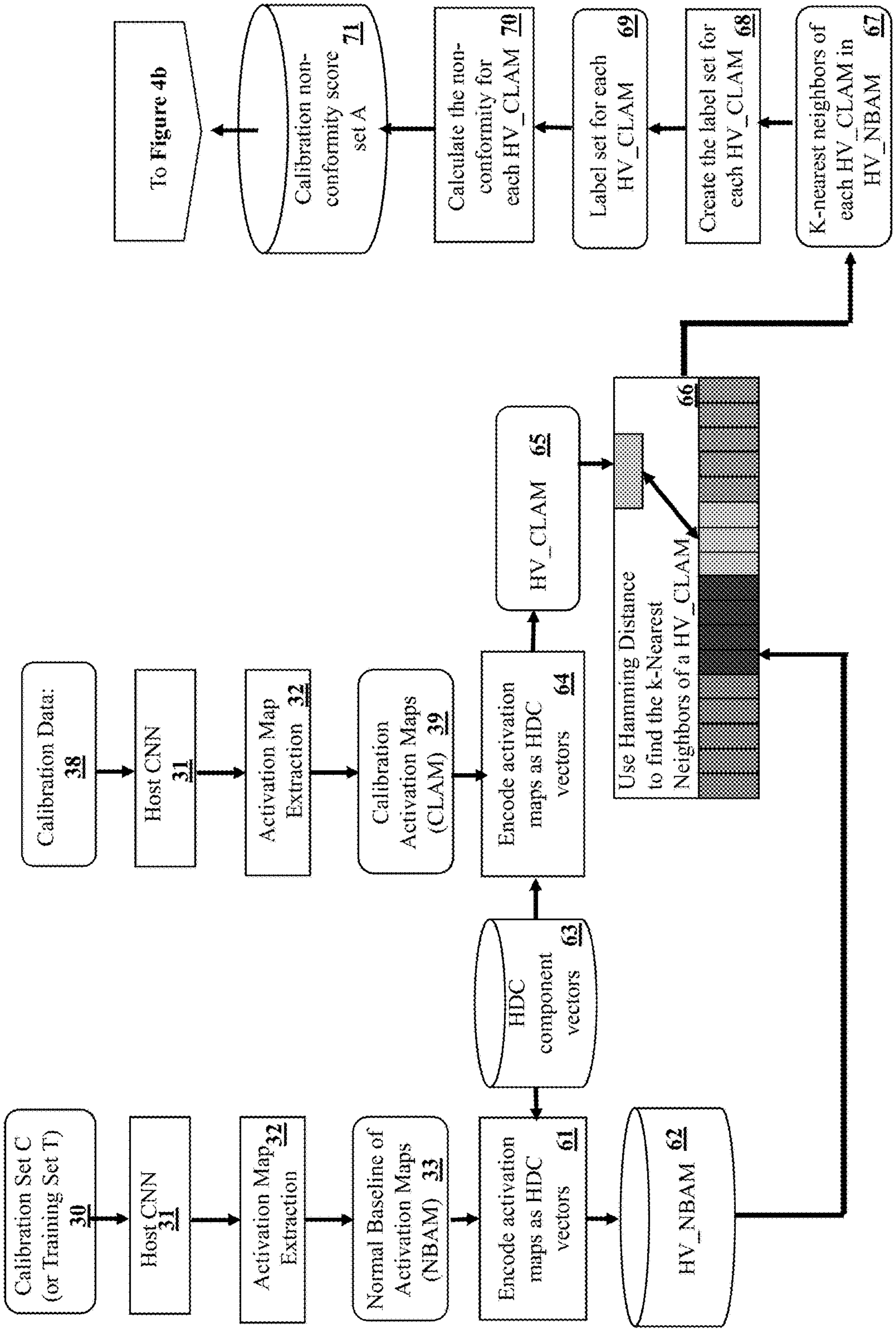
FIG. 4*a* exemplifies system for implementing the calibration phase of AMA process query using HDC in accordance with an embodiment herein.
Figure 4B:
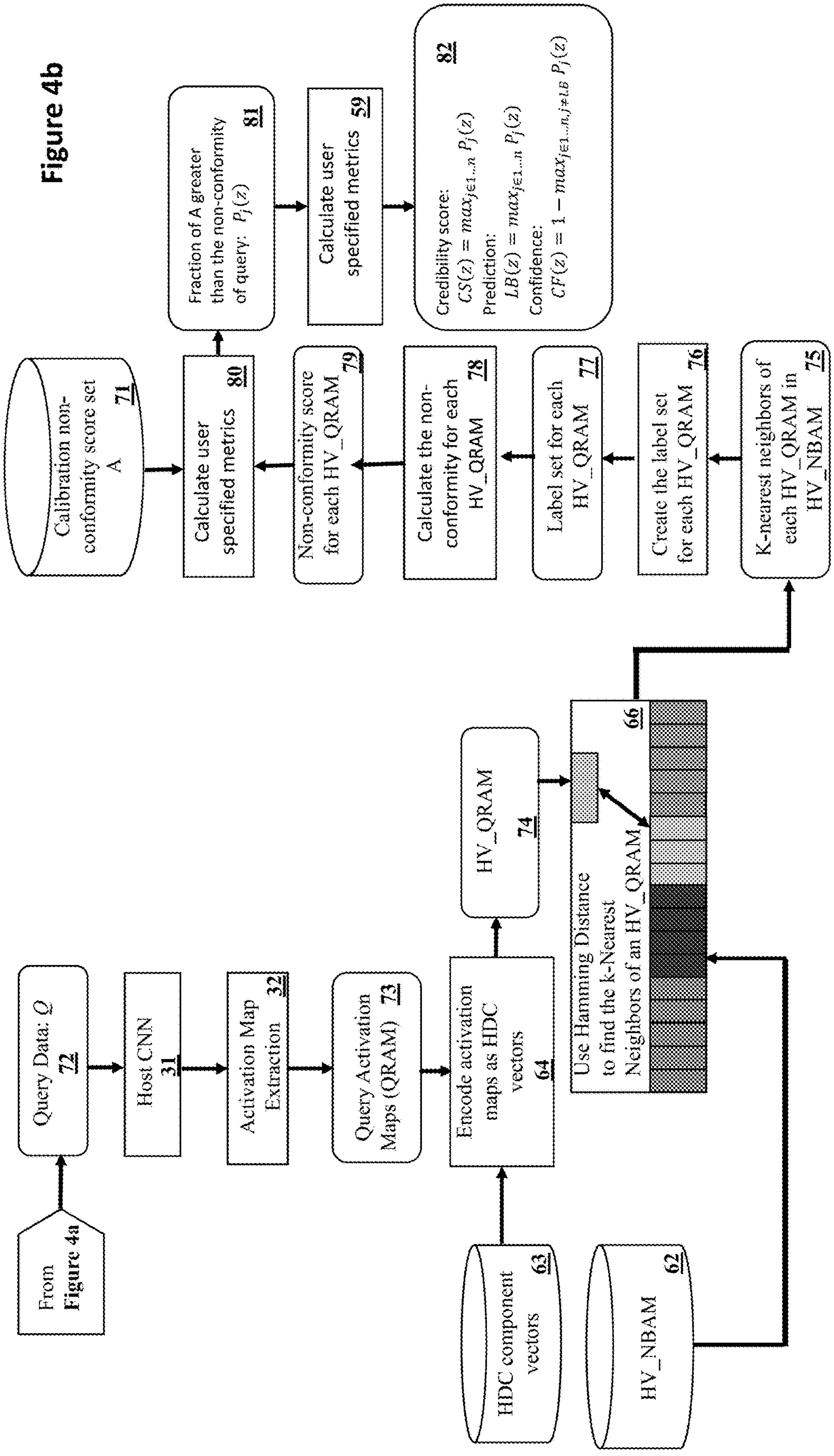
FIG. 4*b* exemplifies system for implementing the inferencing phase of AMA process query using Hyperdimensional Computing (HDC) in accordance with an embodiment herein.

In the second embodiment of the AMA, the data reduction technique PCA is replaced by HDC encoding. Activation maps are encoded by HDC methods as hypervectors to reduce the data dimensionality. As in the first embodiment, there are two phases: calibration (FIG. 4*a*) and inferencing (FIG. 4*b*).

In the calibration phase (FIG. 4*a*), we first build a "normal" baseline activation map (NBAM). The user provides a calibration dataset 30, C, that is in the same distribution as the dataset (T) used for training the host CNN model 31. Each element of C=X×Y, is a 2-tuple, (x,y), x∈X is the input sample, and y ∈ Y is its associated class label. The elements of the calibration set (or training dataset is available) are fed into the host CNN model 31, one at a time, and the activation maps at each layer of the host are captured by the Activation Map Extraction module 32. A "normal" baseline of activation maps 33 (NBAM) can then be built as a set of activation maps for each layer of the host. Each set consists of activation map vectors, each of which is formed by stacking the rasterized activation maps of an image from the calibration dataset 30. If the original training dataset T, is available, the normal baseline of the activation maps can be built using T instead.

As each activation map vector in the NBAM normally has very large dimensions, data dimension techniques are invoked to reduce the dimensionality of vectors in NBAM. In this embodiment, hypervectors representing the activation maps are calculated by Hyperdimensional Computing (HDC) 61. To encode NBAM, a set of HDC component vectors 63 are pre-computed and stored in the files on the hard drives. The set of HDC component vectors 63 are binary hypervectors that represent the different attributes of an activation map, i.e., pixel value, pixel position, and layer position within the host network. These are generated by randomly sampling their vector elements from a Bernoulli distribution with probability p=0.5. The NBAM are encoded with the HDC component vectors as its basis. The resulting vector HV_NBAM, is stored in the files on hard drives 62.

There are two approaches for encoding activation maps of different layers. One approach directly performs HDC encoding on the activation map pixel values, positions, and layer indices of activation maps without any preprocessing. A second approach is to first perform some pre-processing calculations on the activation maps and produce some feature vectors. The HDC is then performed on the feature vectors resulting from the pre-processing, which is explained in more detail later.

Next, calculate the baseline non-conformity, which represents how well each element in C conforms with the NBAM. Start with feeding the calibration dataset 38 into the host network 31. The activation map extraction module 32 produces the calibration activation maps 39 (CLAM). With the calibration activation maps 39 and HDC components 63 as inputs, the HDC encoding module 64 produces hypervector for CLAM, HV_CLAM 65.

Use Hamming distance to find the K-nearest neighbors 66 of each element of HV_CLAM 65 in the HV_NBAM 62 for each element of C, x: Γ={K–nearest neighbors of x in the normal baseline}. The k-nearest neighbors of each element of NV_CLAM 65 are stored in the memory 67.

Create the label set 68 for x (a multi-set): $\Omega_\lambda=\{Y_i:i\in\Gamma\}$, where is the layer index, and $Y_i$ is the class label for the i-th nearest neighbor. The label sets are stored in memory 69. Calculate the calibration non-conformity of each HV_CLAM 70: $\alpha(x,y)=\Sigma_{\lambda\in 1 \ldots l}\, |\lambda i\in\Omega_\lambda: i\neq y|$ for each element of C. The non-conformity set of calibration set is A={a(x,y):(x,y) ∈ C}, and is stored in the files on a hard drive 71.

In the inferencing phase (FIG. 4*b*), the query input z, which is an element of query dataset Q 72, is fed into the host CNN model 31 and activation maps are extracted my module 32 and query activation maps (QRAM) 73 are captured while z passes through the host CNN model 31. This process is repeated for all elements of Q. In the inferencing phase, it assumes that the HDC encoded NBAM, HV_NBAM 62, and the HDC component vectors 63 are precalculated, and can be readily retrieved for inferencing.

Next, the QRAM is then HDC encoded 64 as HV_QRAM 74. Using Hamming distance, find the K-nearest neighbors 66 of each element of HV_QRAM 74 in the HV_NBAM 62 for each element of C, x: Γ={K-nearest neighbors of x in the normal baseline}. The k-nearest neighbors of each element are stored in the memory 75. Label set 76 is created for each x (a multi-set): $\Omega_\lambda=\{Y_i:i\in\Gamma\}$, where λ is the layer index. The label sets are stored in memory 77. The non-conformity 78: $B=\{a(z,j)=\Sigma_{\lambda\in 1 \ldots l}|i\in\Omega_\lambda:i\neq y|:j\in 1 \ldots n\}$ for each element of Q is calculated. The non-conformity score set B is stored in memory 79.

Once the conformity scores of the HV_QRAM 79 are available, and the non-conformity set of calibration, A={a (x,y):(x,y)∈Q} 71 is retrieved, the AMA with HDC encoding follows the first embodiment to calculate the fraction of the A that have higher non-conformity values than the threshold (equation 1), a(z,j)∈B, for each class j, which results in 81. Based on 81, the module of user specified metrics eq. 2 59 calculates the credibility score, class label prediction, and prediction confidence, and the results are in memory 82.

Figure 5:
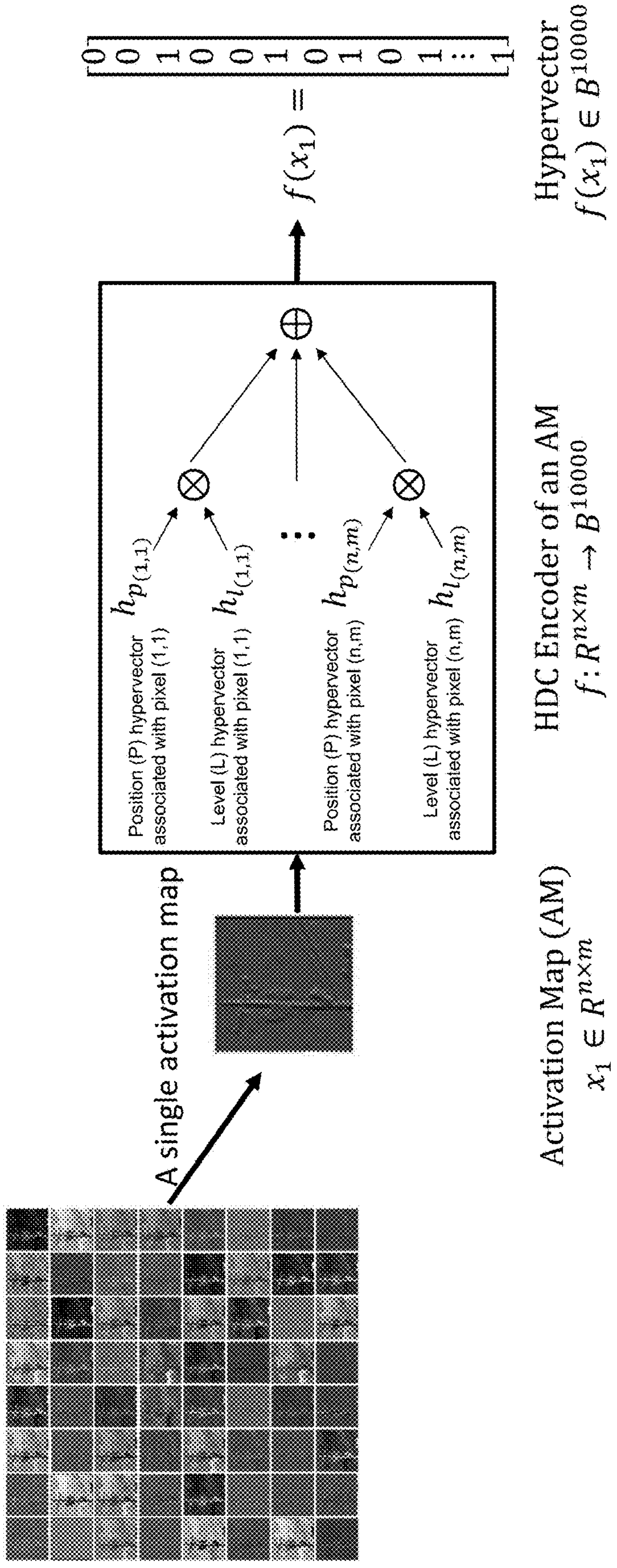
FIG. 5 illustrates HDC for encoding a single activation map in a layer.

FIG. 5 illustrates HDC for encoding a single activation map in a layer.

Figure 6:
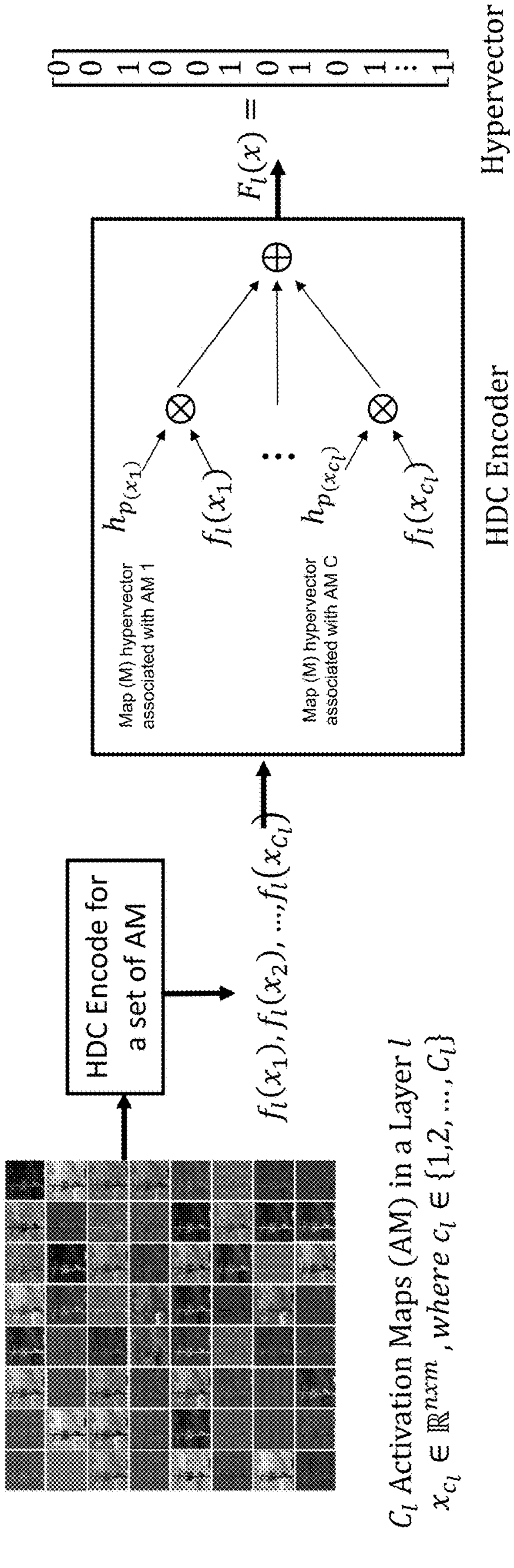
FIG. 6 illustrates HDC for encoding all activation maps in a single layer.

FIG. 6 illustrates HDC for encoding all activation maps in a single layer.

Figure 7:
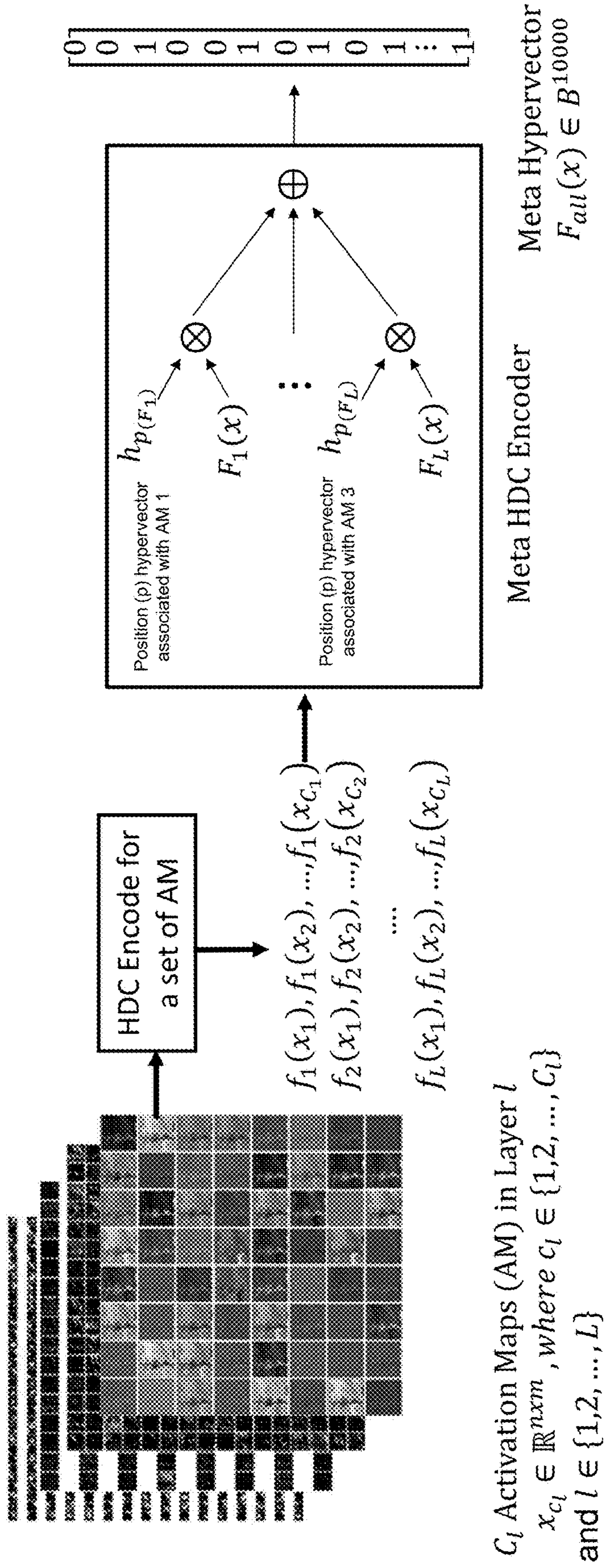
FIG. 7 illustrates HDC for encoding all layers in a meta hypervector.

FIG. 7 illustrates HDC for encoding all layers of the host network into a meta-hypervector.

There are three configurations of the AMA credibility calculation implemented using HDC: single-layer credibility—calculate the credibility using the hypervectors from a single selected layer; multi-layer credibility—calculate the credibility using the hypervectors from a set of selected layers; and meta-layer credibility—calculate the credibility using the meta-hypervectors, which represents the activation maps of all layers of the host network.

The use of HDC within AMA maintains comparable performance as that from using PCA on the activation map data for dimensionality reduction. To illustrate this, we compare both versions of AMA (PCA vs. HDC) where the host network is a ResNet-101 CNN trained only on 13 classes of the ImageNet dataset. By way of example only, credibility calculations were determined using the following exemplary layers and activation map feature data:

a. Residual Block 1 (Layer F5)—256×56×56 size=~800 k features
b. Residual Block 2 (Layer F6)—512×28×28 size=~400 k features
c. Residual Block 3 (Layer F7)—1024×14×14 size=~200 k features
d. Residual Block 4 (Layer F8)—2048×7×7 size=~100 k features
e. Final Hidden Layer (Layer F9)—2048 features With reference to the process of FIG. 1, the calculation of the non-conformity metrics 20 are based on using k=10 for the k-NN similarity distance determination 16. This calibration image set storage 18 includes 3900 samples and both the in-domain/validation and out-domain image sets contain 750 samples each. To compare the performance between the two versions, we plot the distributions of the in-domain/validation and out-domain sample credibility scores, the receiver operating characteristic (ROC) curve based on the sample credibility scores, and the respective area under the curve (AUC) scores.

Figure 8A:
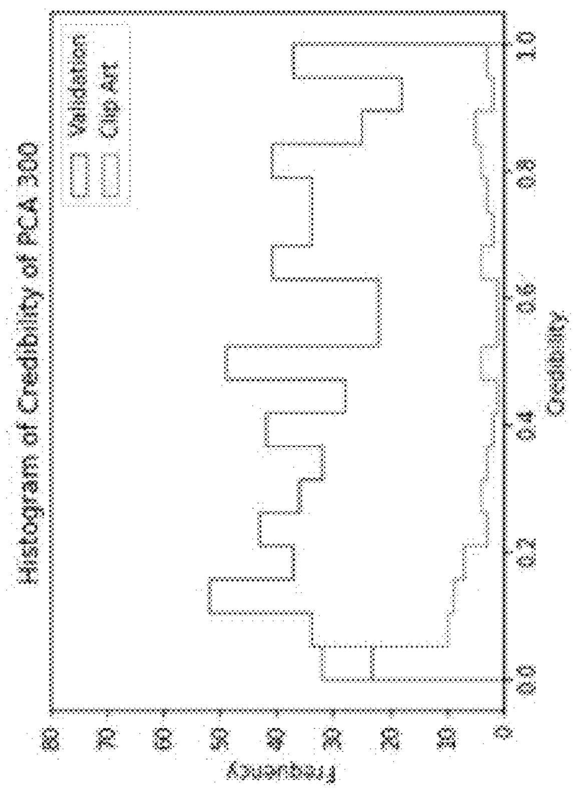
FIGS. 8*a* to 8*f* illustrate exemplary AMA with PCA performance on three different out-domain datasets.
Figure 8B:
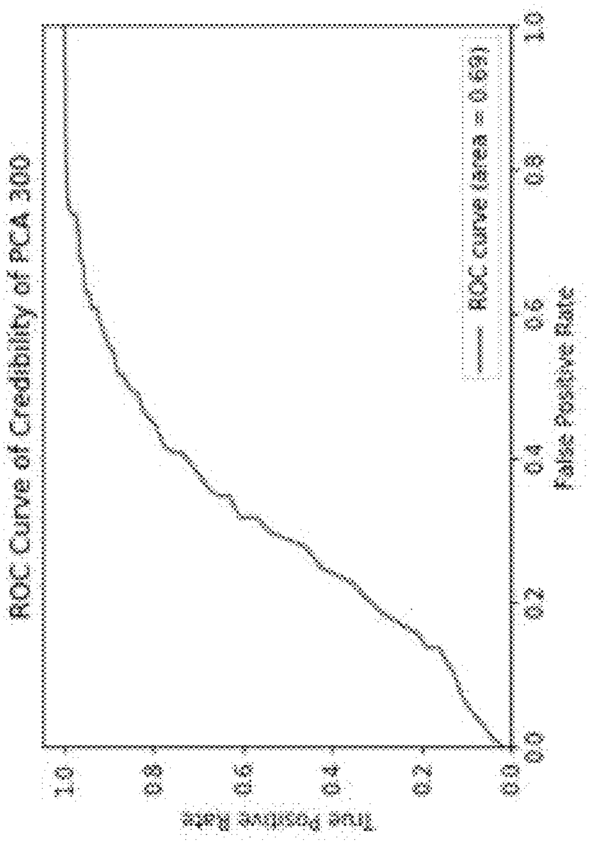
Figure 8C:
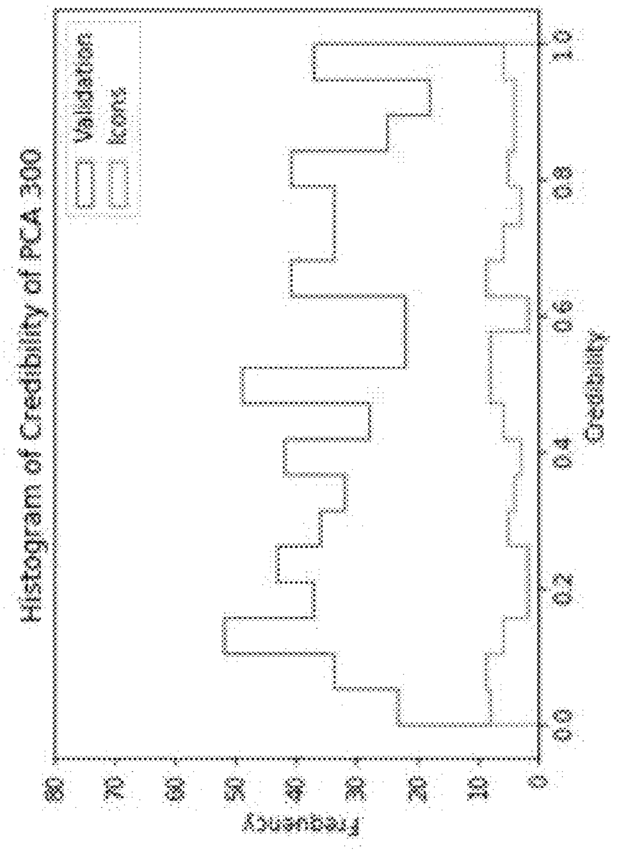
Figure 8D:
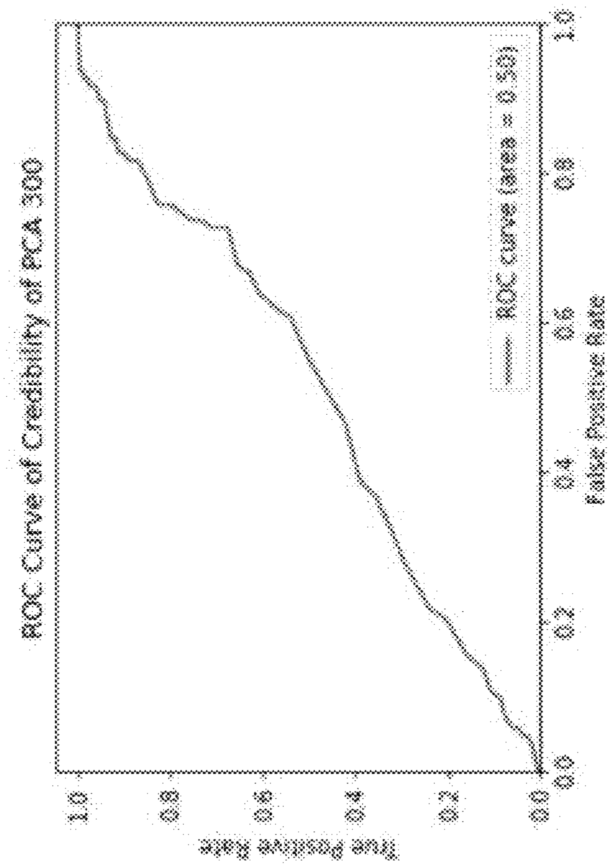
Figure 8E:
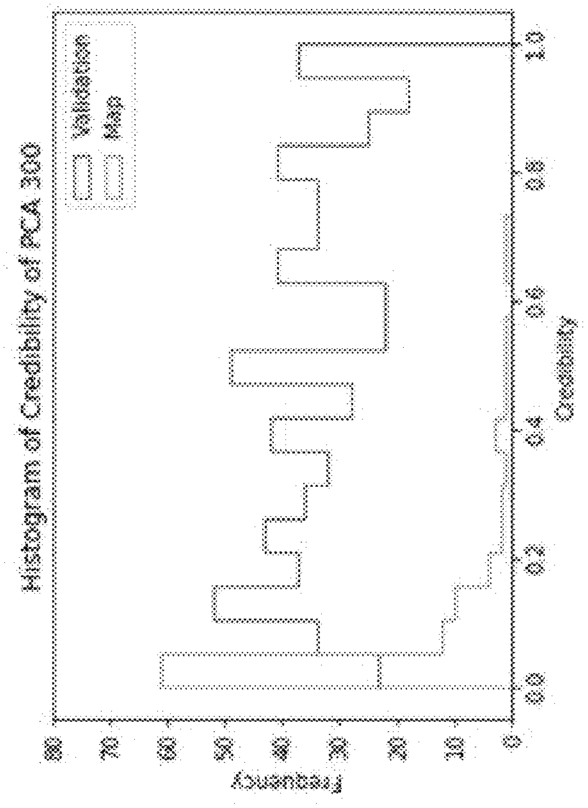
Figure 8F:
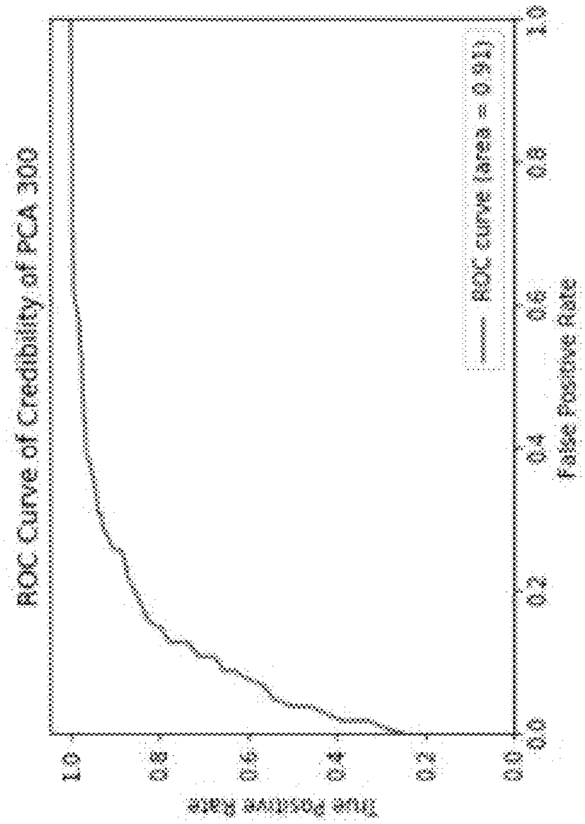
Figure 9B:
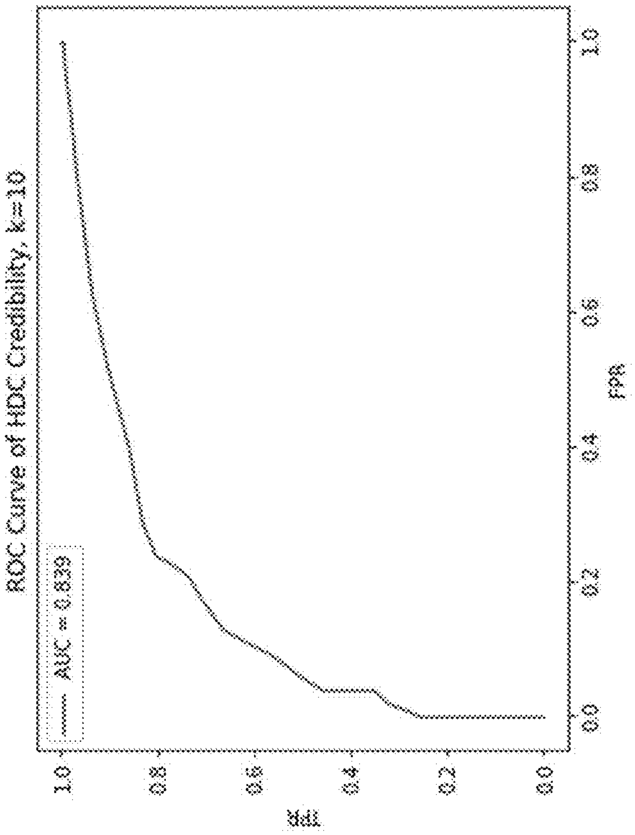
FIGS. 9*a* to 9*f* illustrate exemplary AMA with HDC performance on three different out-domain datasets.
Figure 9A:
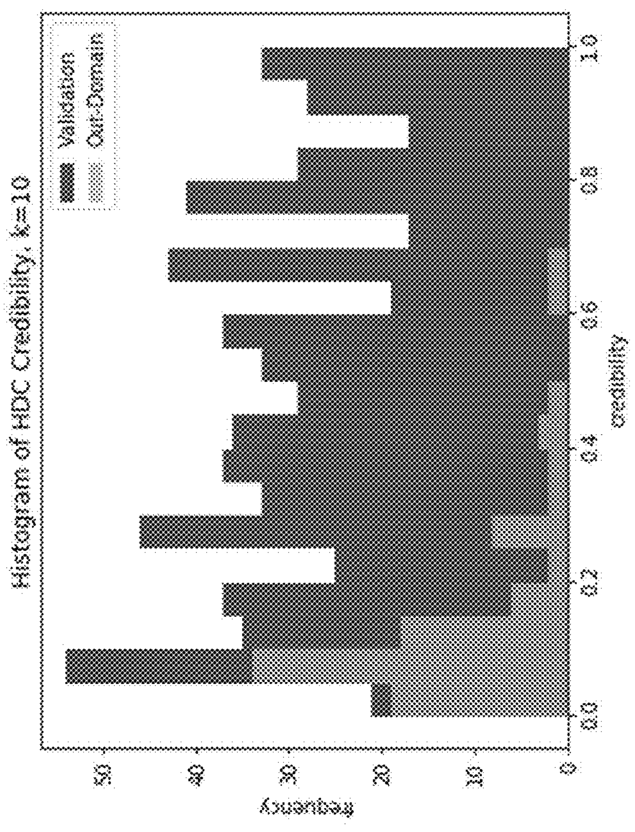
Figure 9D:
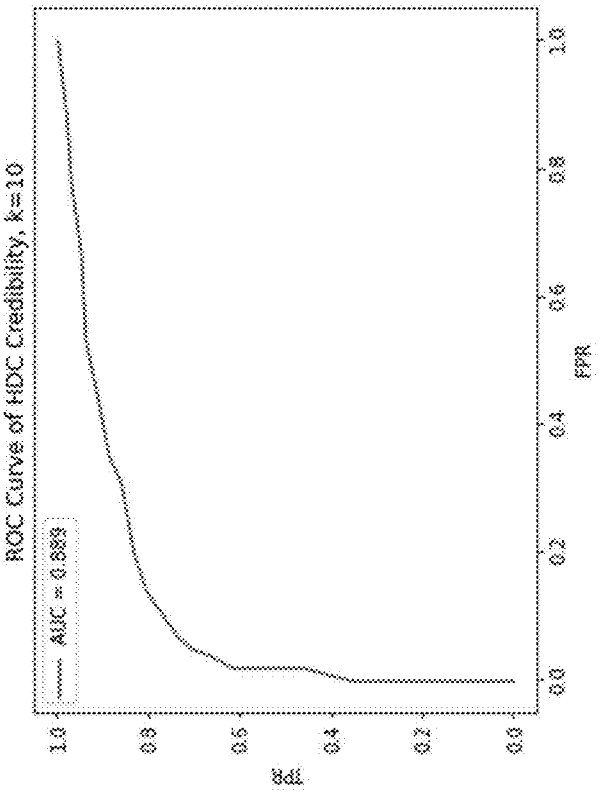
Figure 9C:
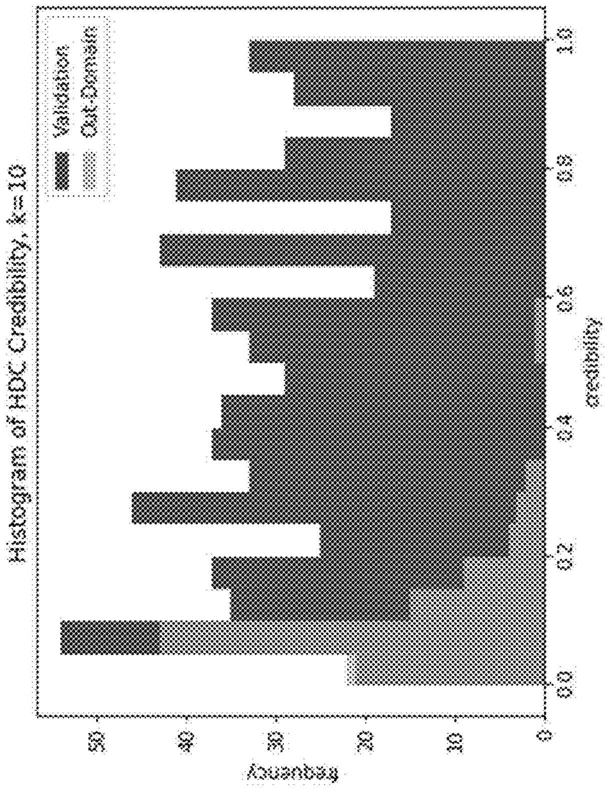
Figure 9F:
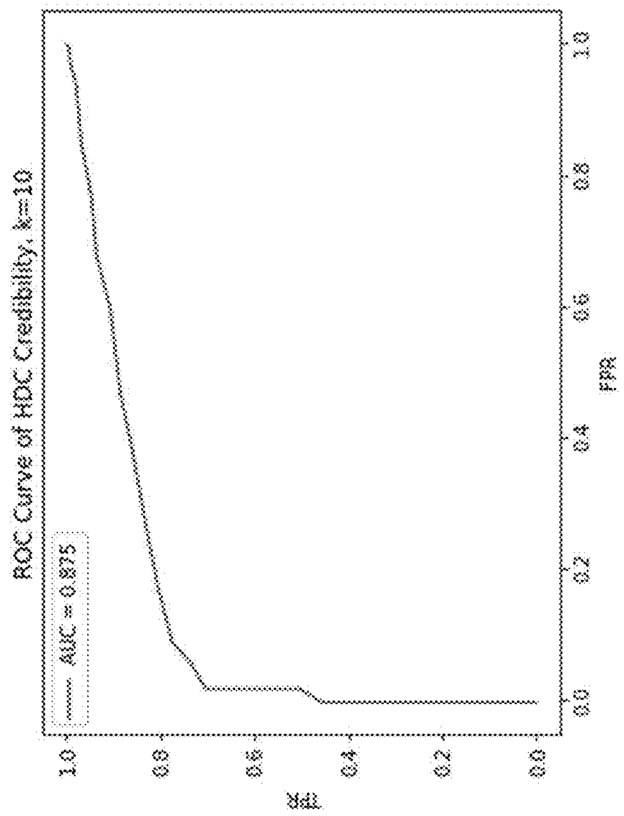
Figure 9E:
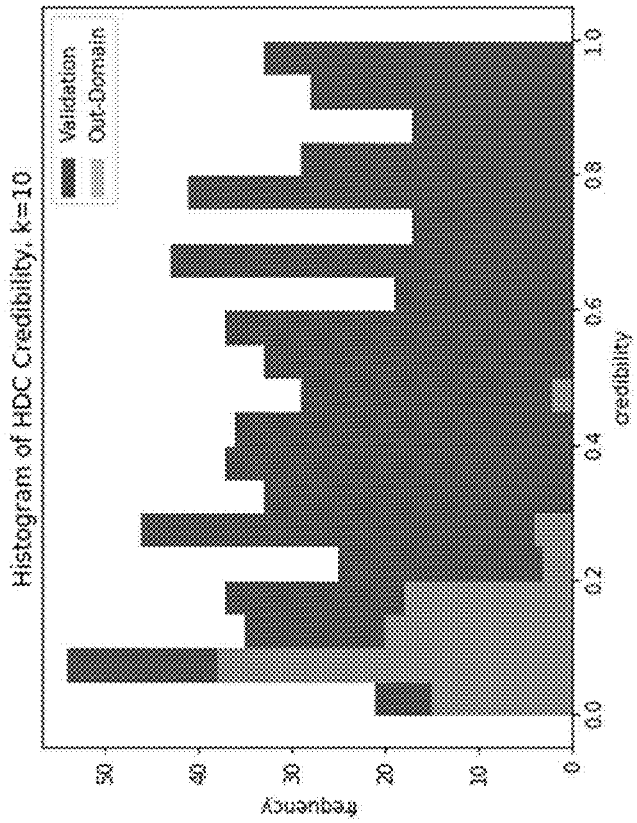
Figure 10B:
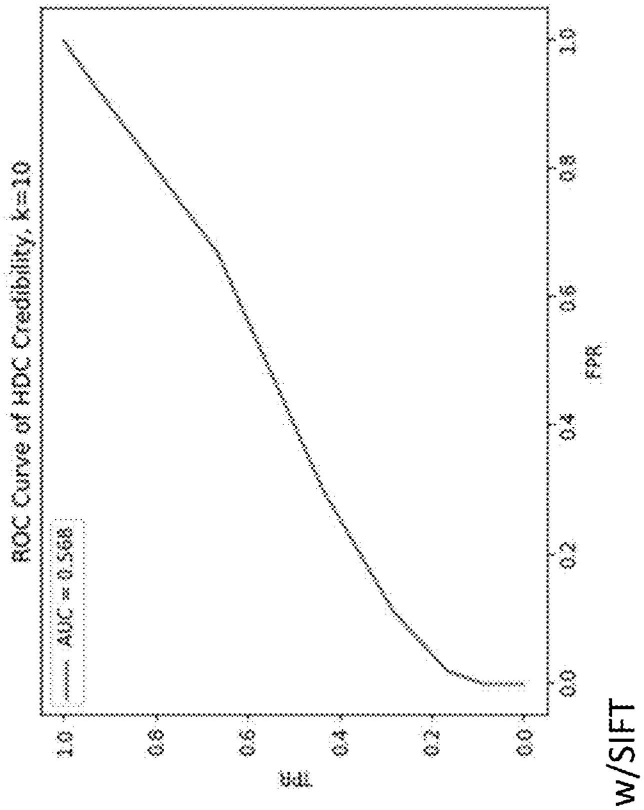
FIGS. 10*a* to 10*l* illustrate exemplary AMA with HDC performance w.r.t to a single layer, where each layer is represented by single hypervector.
Figure 10A:
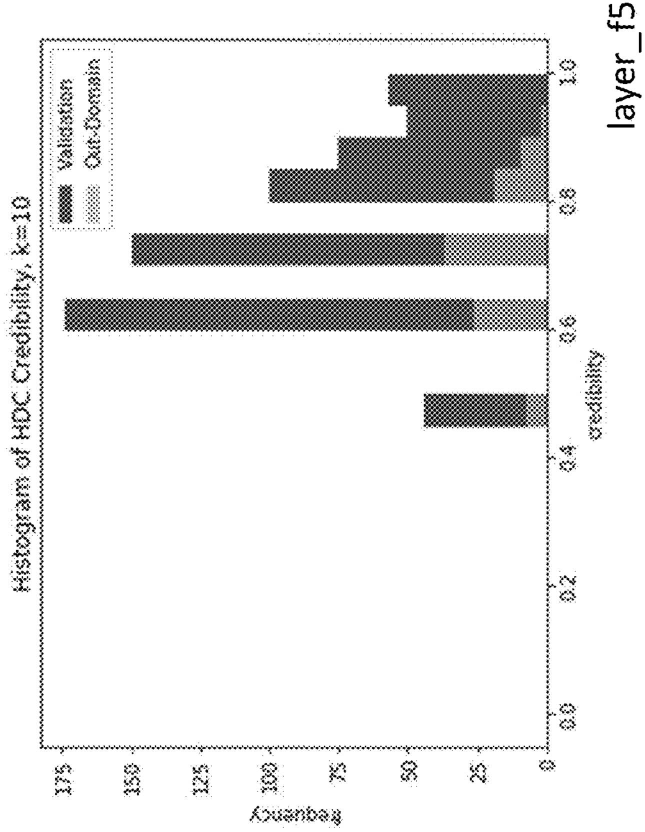
Figure 10C:
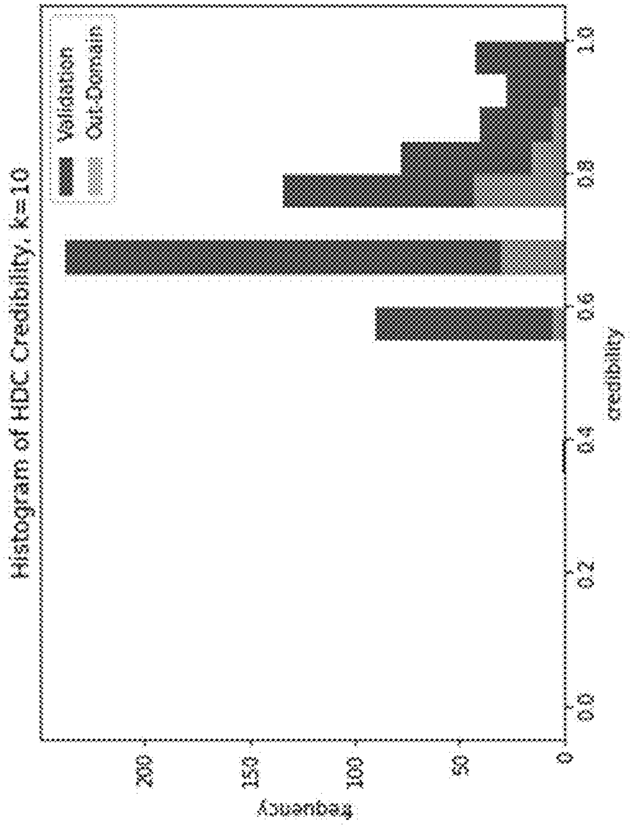
Figure 10D:
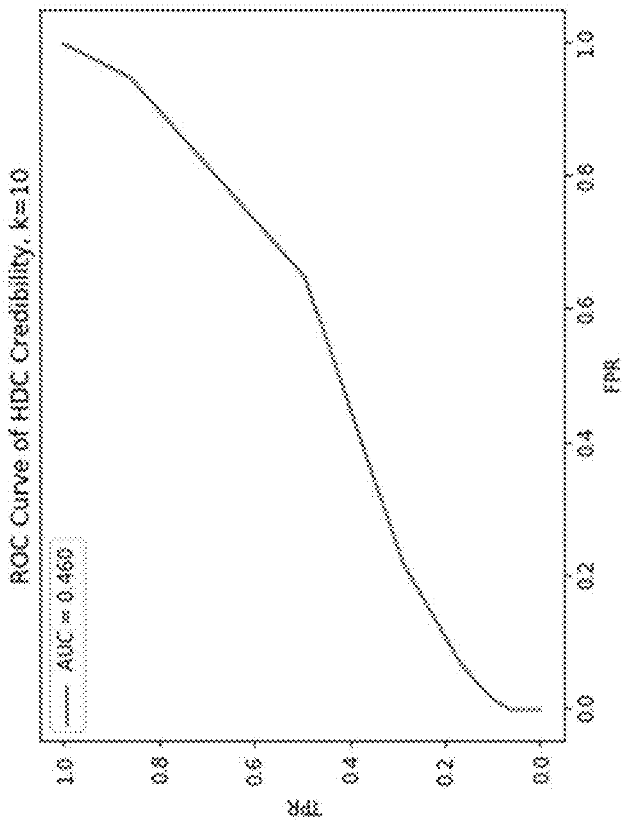
Figure 10E:
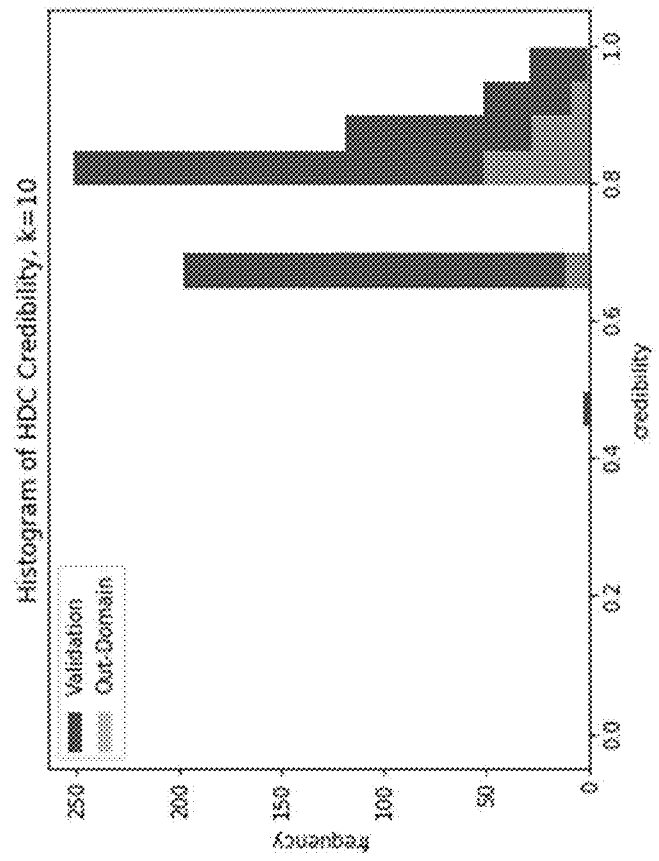
Figure 10F:
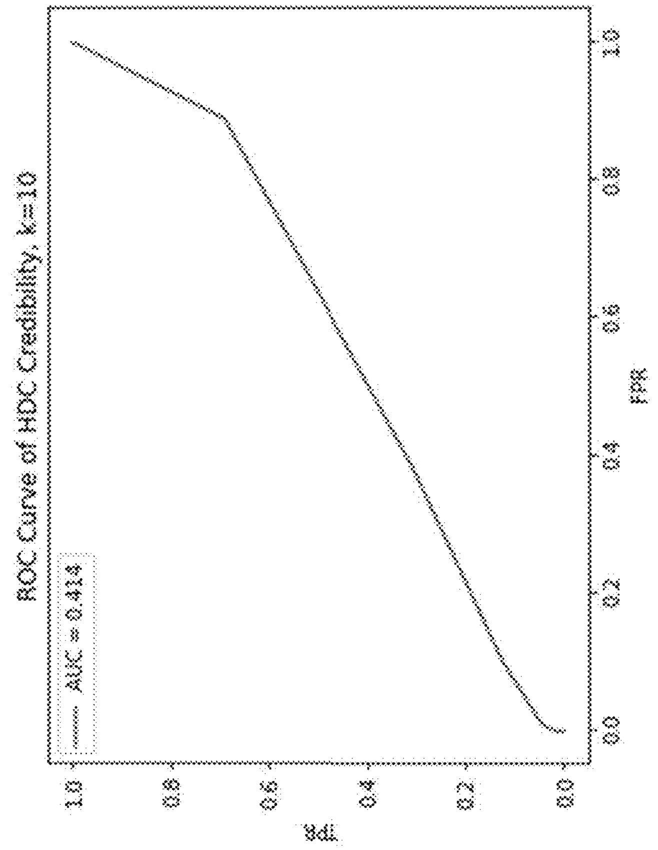
Figure 10H:
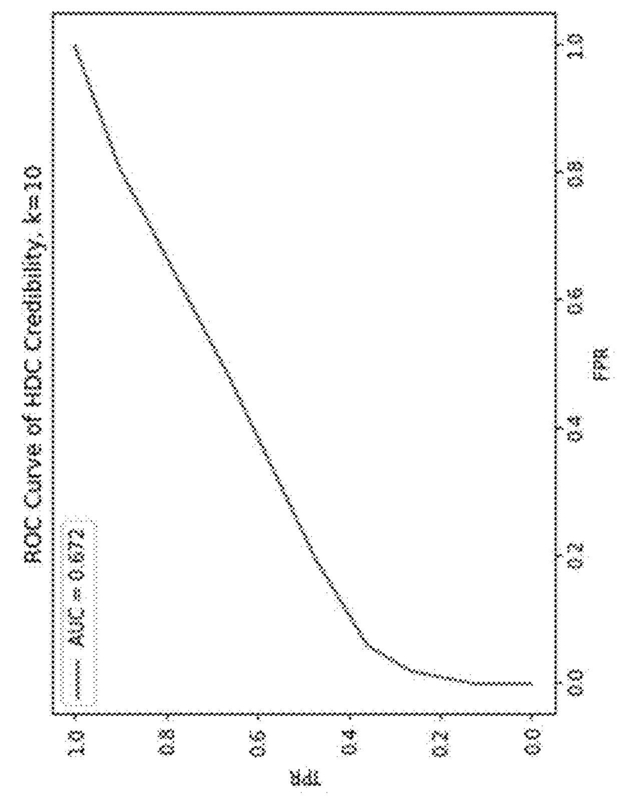
Figure 10G:
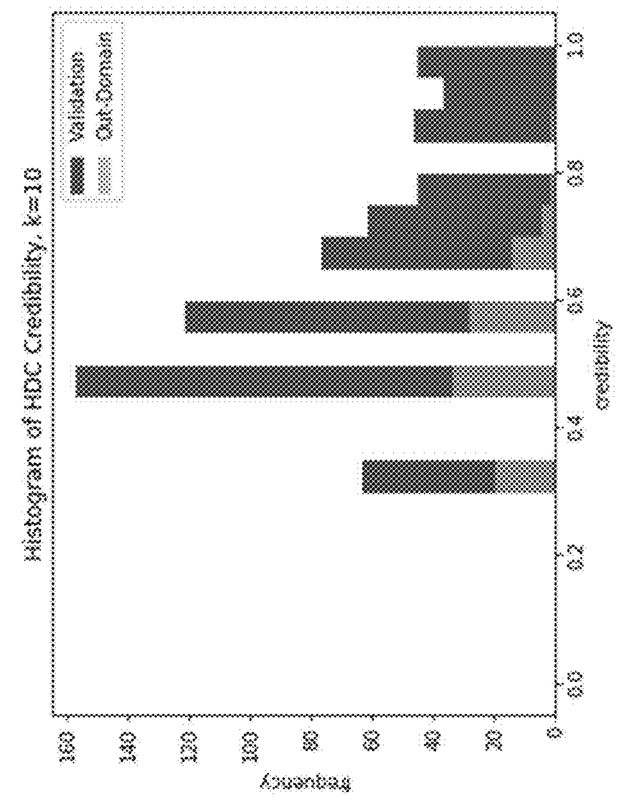
Figure 10I:
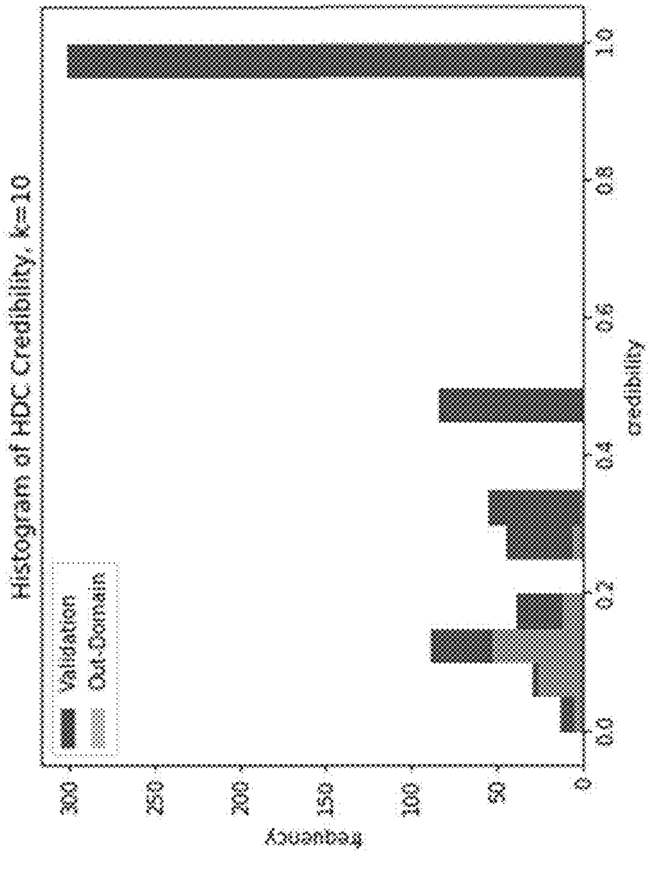
Figure 10J:
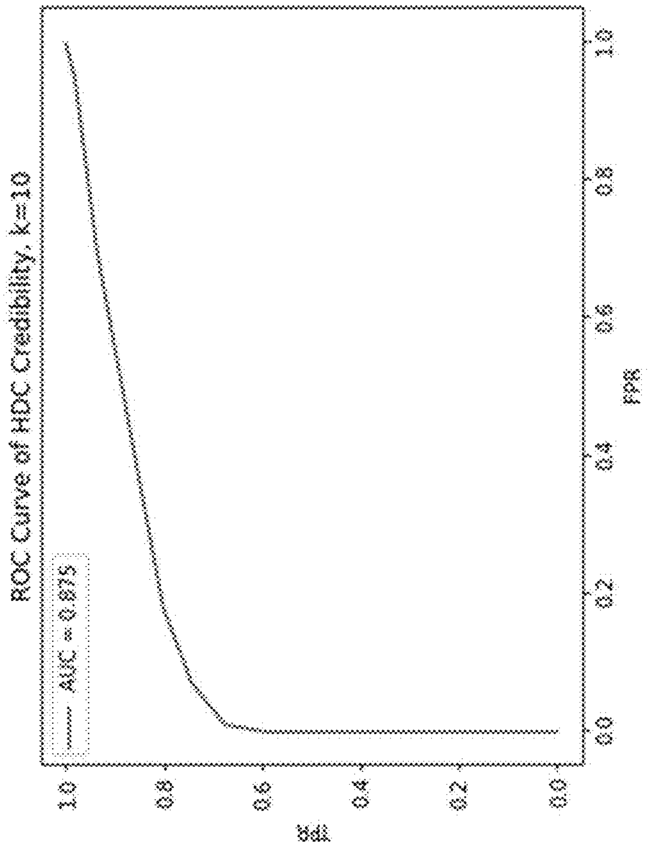
Figure 10K:
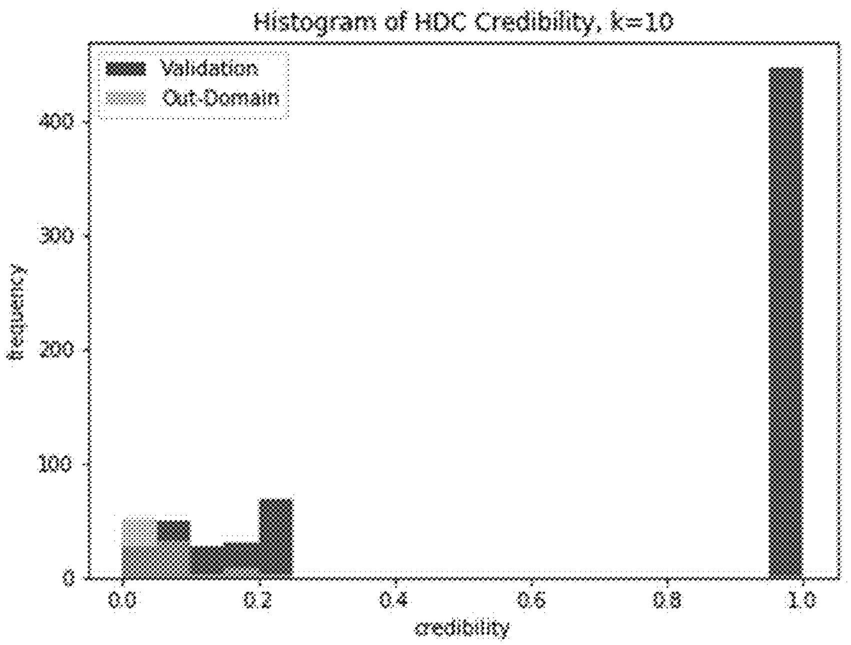
Figure 10L:
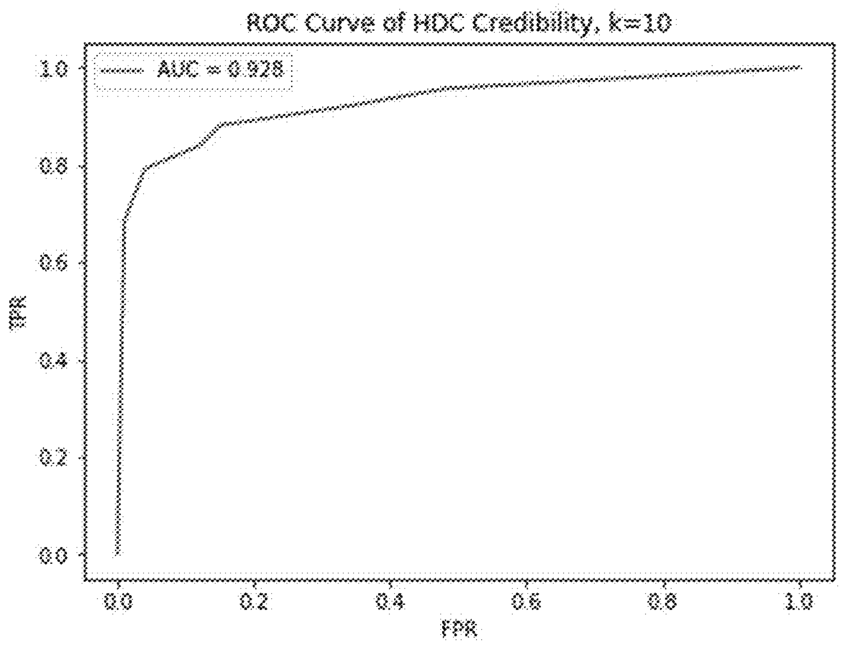

FIGS. 8*a* to 8*f* show the distribution of credibility scores and the respective ROC/AUC metrics for the version of AMA with PCA discussed above on three different out-domain datasets: (1) clip art (FIGS. 8*a*, 8*b*), (2) icons (FIGS. 8*c*, 8*d*), and (3) map tiles (FIGS. 8*e*, 8*f*). From this, we can see that the use of PCA within AMA provides excellent performance in detecting the map tiles as out-domain samples (AUC=0.91 as shown in FIG. 9*f*) but does relatively poorly for the other two out-domain datasets (AUC=0.69 for clip art per FIG. 8*b*, AUC=0.50 for icons per FIG. 8*d*).

FIGS. 9*a* to 9*f* show the same analysis but for the version of AMA with HDC discussed above. In contrast the AMA-PDC version, this shows that the use of HDC within AMA provides comparable performance in detecting the map tiles as out-domain samples (AUC=0.875, FIGS. 9*e*, 9*f*) but has better performance for the other two out-domain datasets (AUC=0.839 (FIGS. 9*a*, 9*b*), AUC=0.889 (FIGS. 9*c*, 9*d*)). When comparing the two versions of AMA, we can see that the robustness of the HDC encoding of the activation maps provide comparable, if not better, detection performance of the out-domain samples in terms of ROC/AUC metrics.

Table 1 shows the storage size of the HDC components, and the encoding times required at each layer of the host network. The calculated time from HDC encoding to credibility calculation is approximately 150 seconds. Table 2 shows the memory and time complexity between the PCA and HDC versions of AMA. This illustrates the computational complexity required to complete the feature dimensionality reduction 14 module for the 3900 images in the calibration set storage 18. A significant memory reduction is achieved with the HDC version of AMA.

TABLE 1

| Layer | Storage Size of HDC Components | Time for HDC encoding using CuPy |
|---|---|---|
| Layer F9 | ~23 MB | ~400 samples/sec |
| Layer F8 | ~22 MB | 5-6 samples/sec |
| Layer F7 | ~13 MB | 3-4 samples/sec |
| Layer F6 | ~16 MB | 1-2 samples/sec |
| Layer F5 | ~37 MB | ~1 samples/sec |

TABLE 2

| AMA Version | Memory Size | Computation Time (sec) |
|---|---|---|
| PCA (all layers) | ~64 GB | ~329 sec |
| HDC (all layers) | ~110 MB | ~7485 sec |

FIGS. 10*a* to 10*l* illustrate exemplary AMA with HDC performance w.r.t to a single layer, where each layer is represented by single hypervector. For each layer, plus Layer F5 with SIFT (FIGS. 10*a*, 10*b*), performance is shown in a histogram and ROC Curve graph.

Figure 11B:
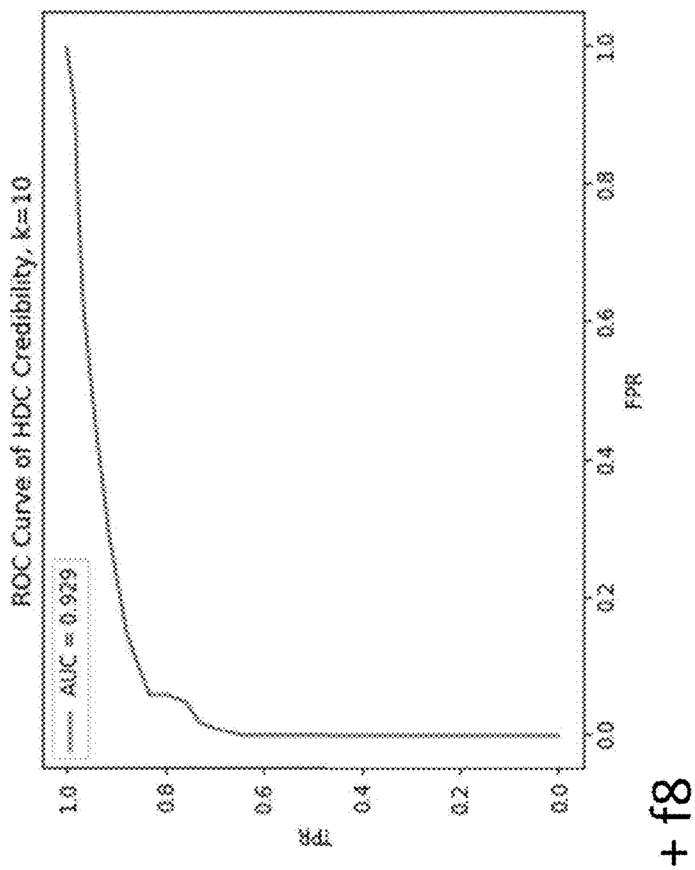
FIGS. 11*a* to 11*h* illustrate exemplary AMA with HDC performance w.r.t. combinations of multiple layers, where each layer is represented by a single hypervector.
Figure 11A:
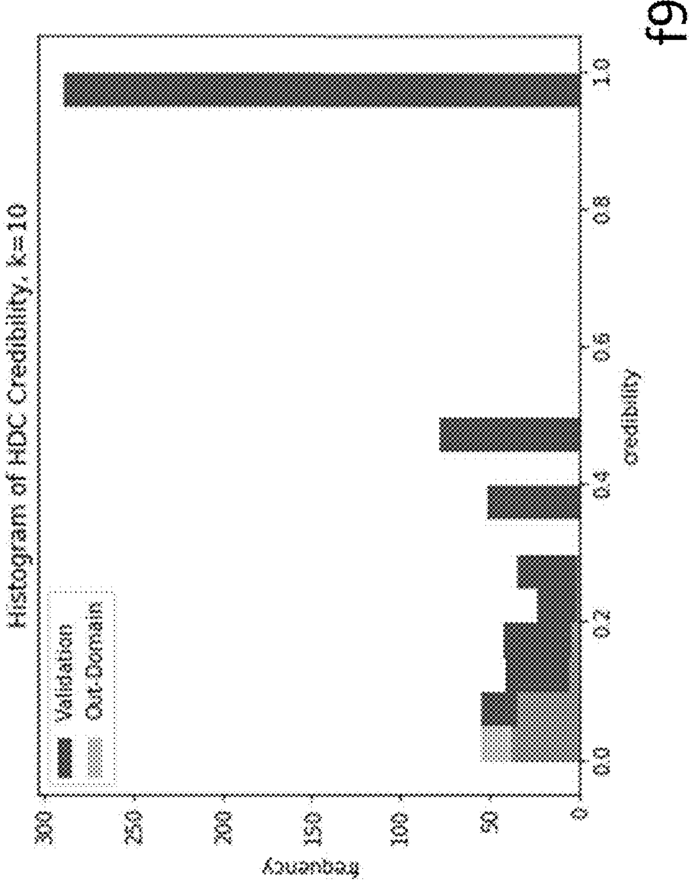
Figure 11C:
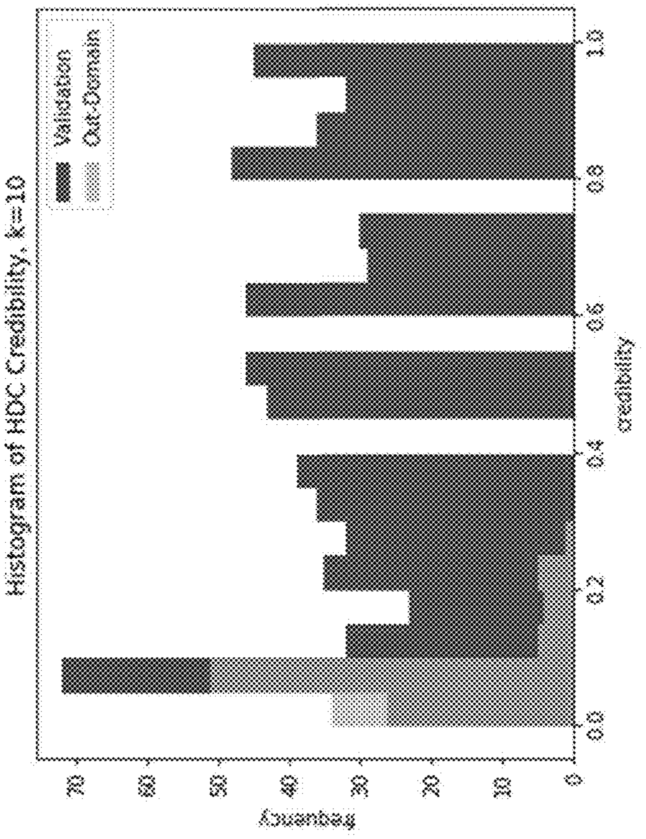
Figure 11D:
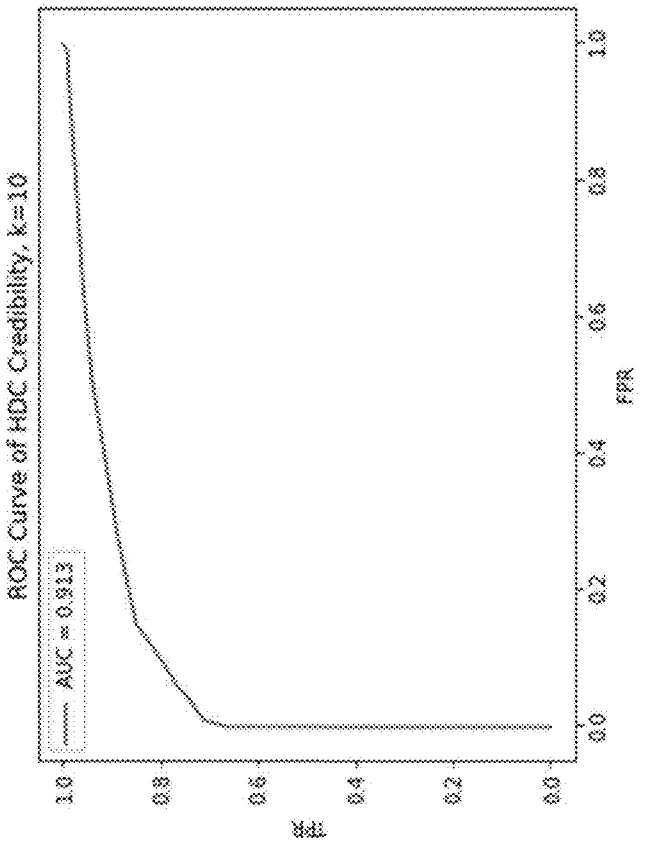
Figure 11E:
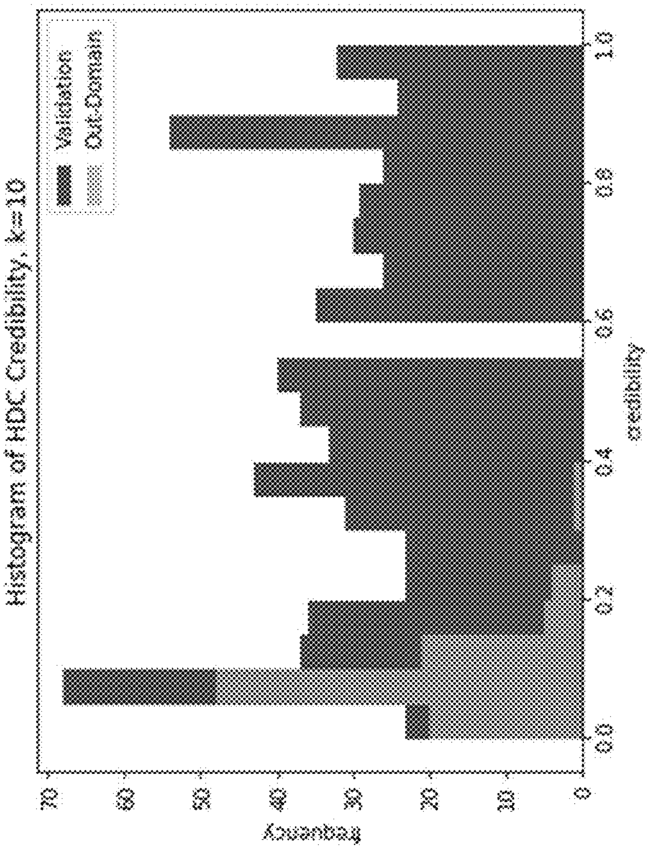
Figure 11F:
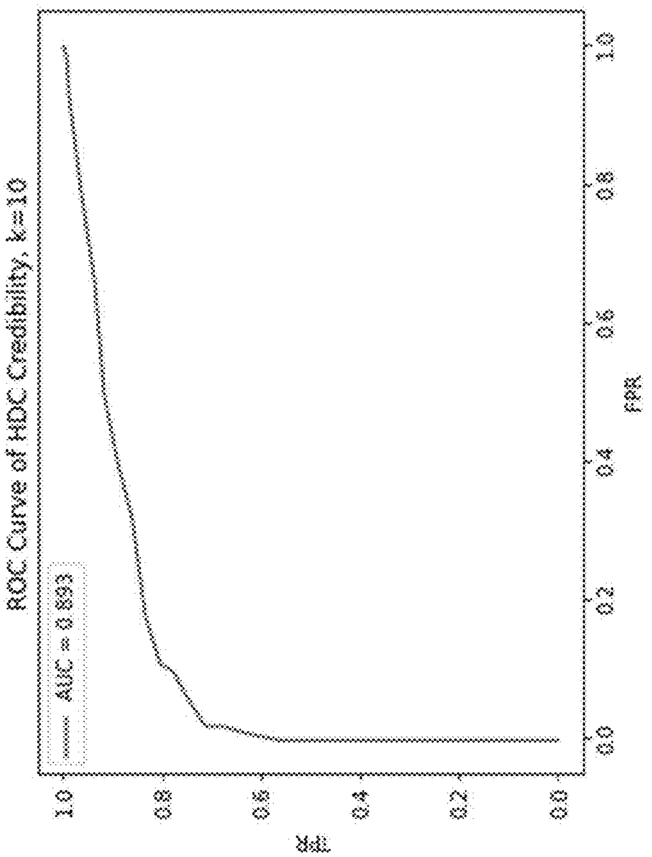
Figure 11G:
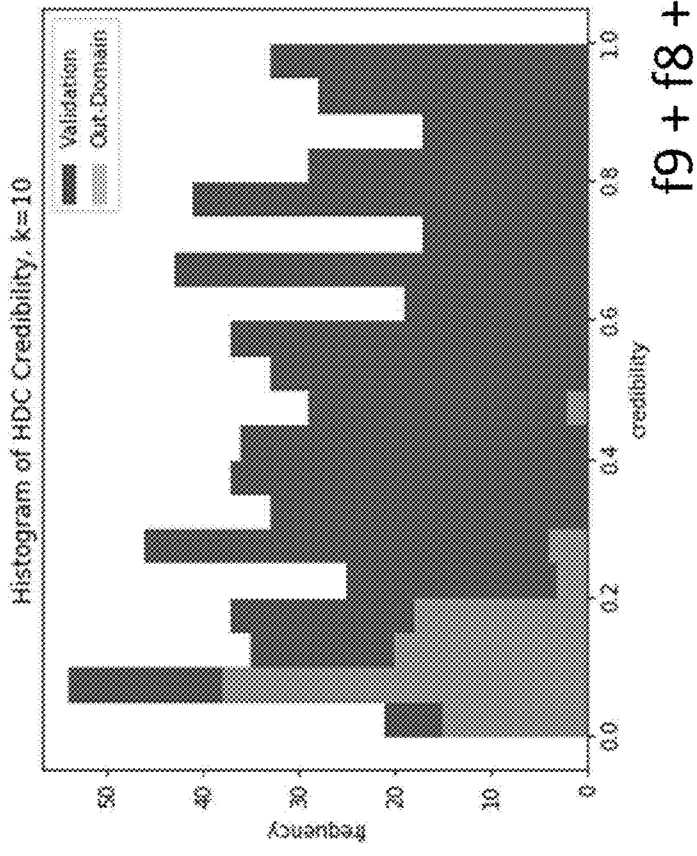
Figure 11H:
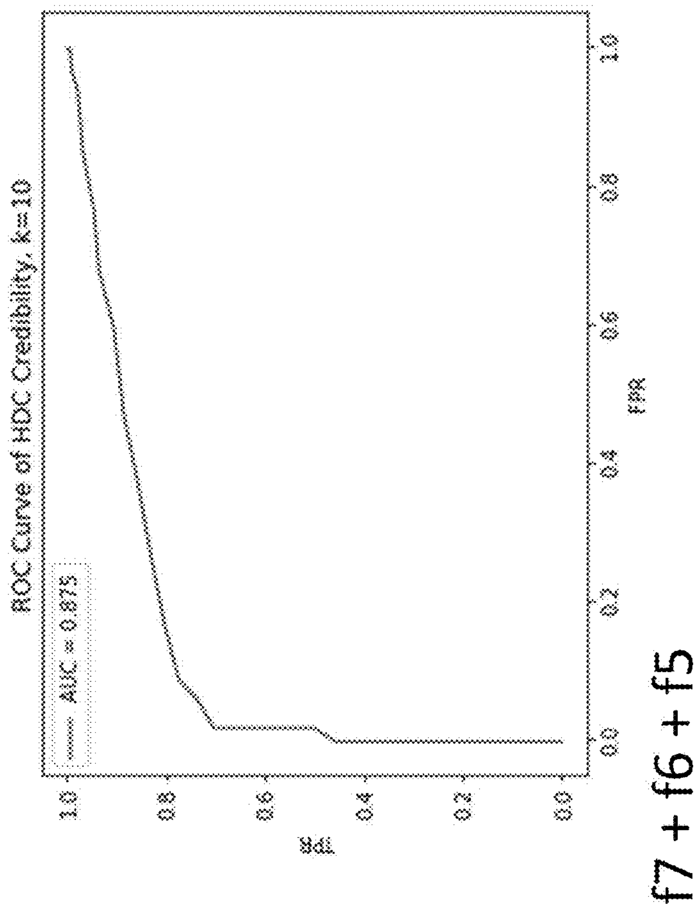
Figure 12B:
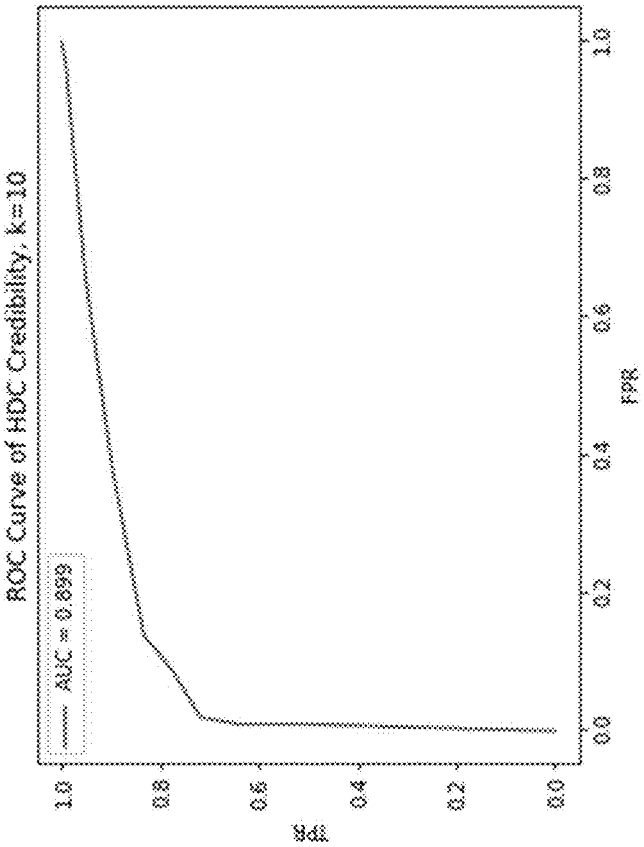
FIGS. 12*a* to 12*h* illustrate exemplary AMA with HDC performance w.r.t to a single meta hypervector, which is built with a combination of multiple layers.
Figure 12A:
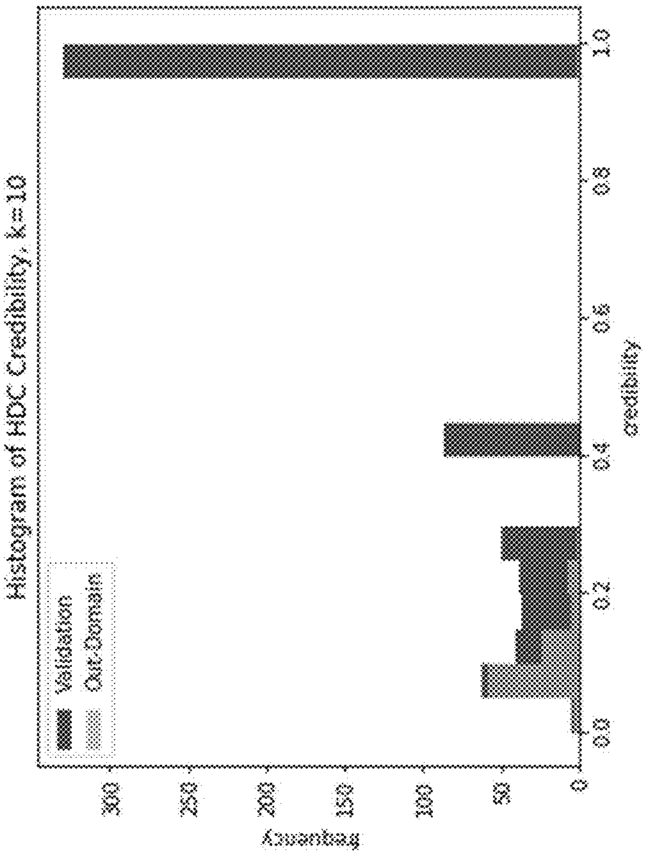
Figure 12C:
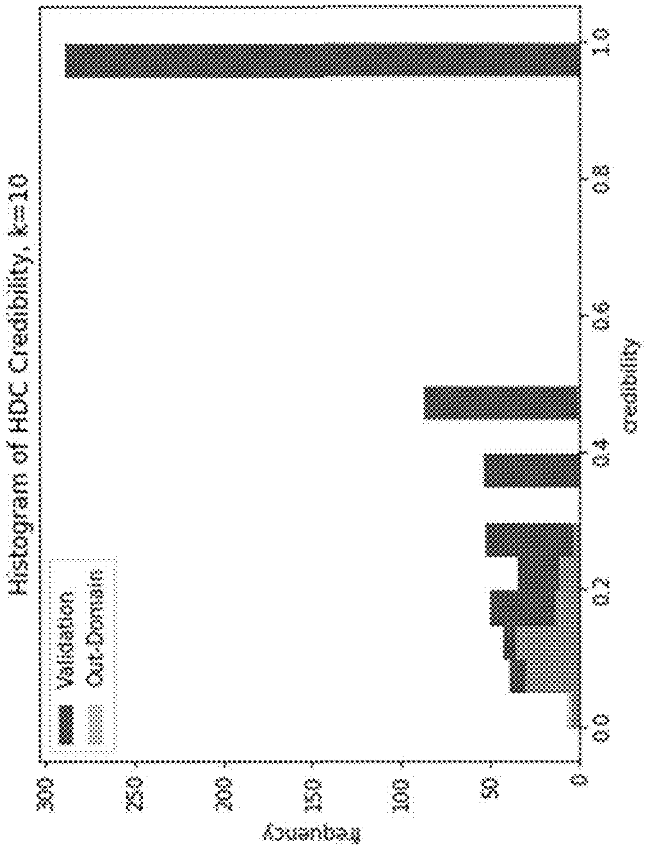
Figure 12D:
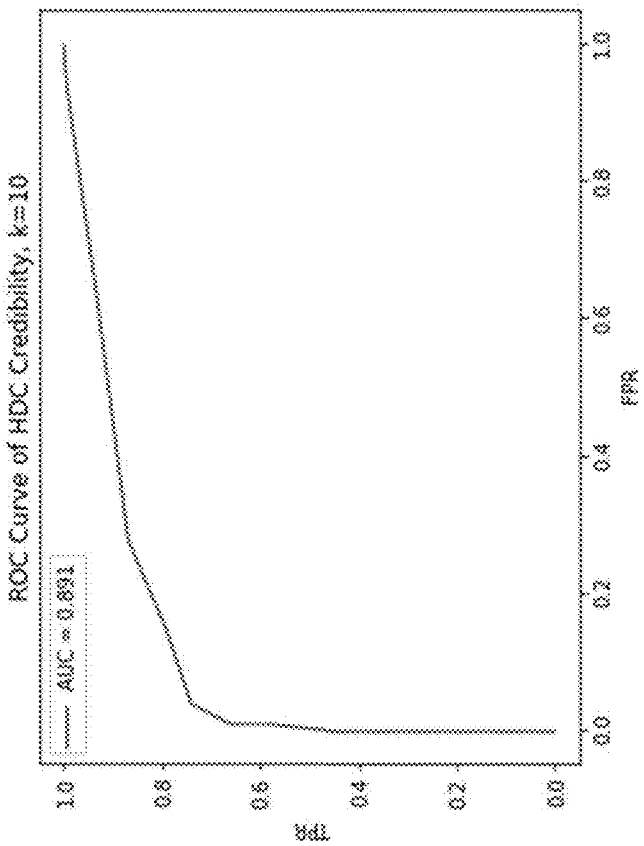
Figure 12E:
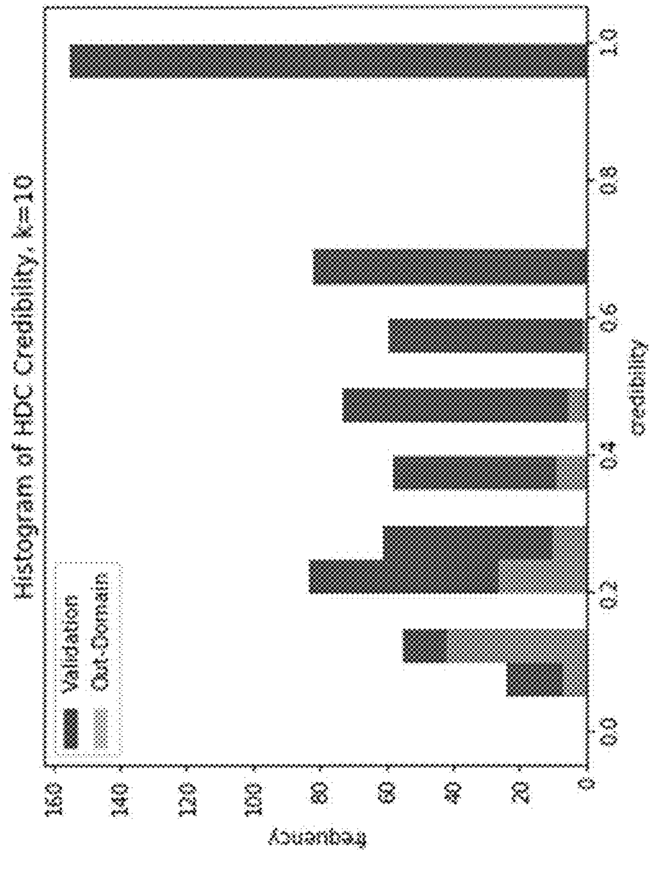
Figure 12F:
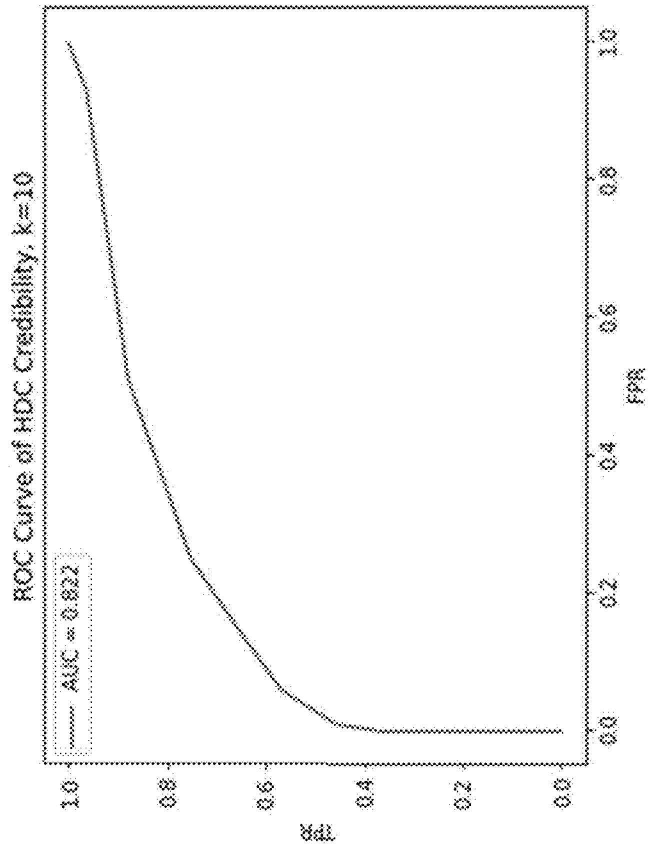
Figure 12G:
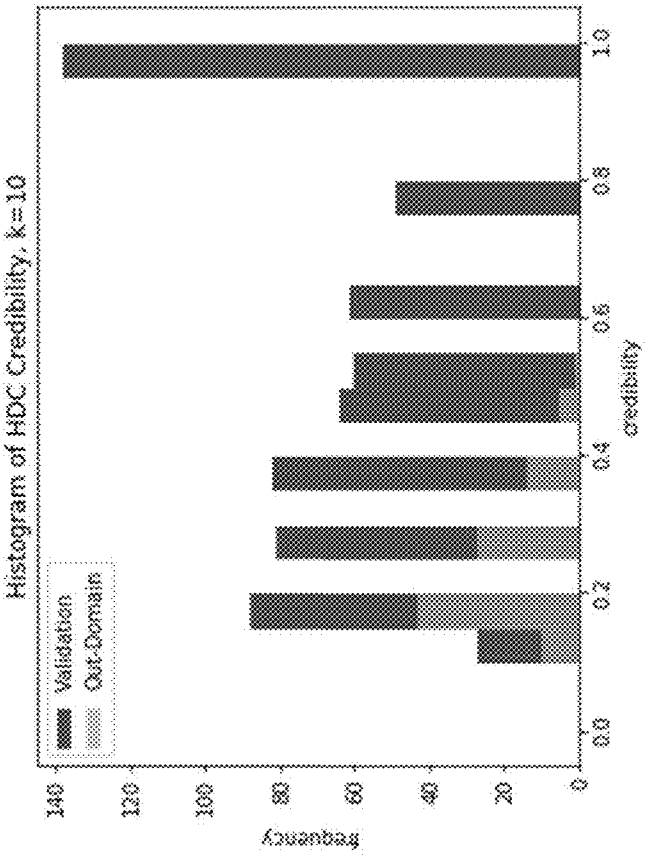
Figure 12H:
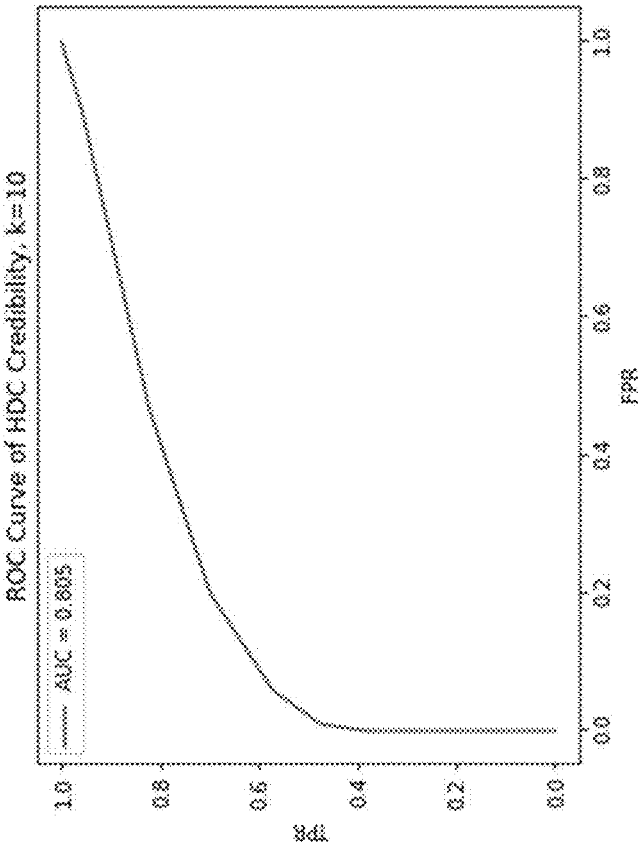

FIGS. 11*a* to 11*h* illustrate exemplary AMA with HDC performance w.r.t. combinations of multiple layers, where each layer is represented by a single hypervector. The performance of layers F9+F8 are shown in FIGS. 11*a*, 11*b*, layers F9+F8+F7 are shown in FIGS. 11*c*, 11*d*, F9+F8+F7+F6 are shown in FIGS. 11*e*, 11*f* and F9+F8+F7+F6+F5 are shown in FIGS. 11*g*, 11*h*. For each layer combination, performance is shown in a histogram and ROC Curve graph.

FIGS. 12*a* to 12*h* illustrate exemplary AMA with HDC performance w.r.t to a single meta hypervector, which is built with a combination of multiple layers. The performance of layers F9+F8 are shown in 12*a*, 12*b*, layers F9+F8+F7 are shown in 12*c*, 12*d*, F9+F8+F7+F6 are shown in 12*e*, 12*f* and F9+F8+F7+F6+F5 are shown in 12*g*, 12*h*. For each layer combination, performance is shown in a histogram and ROC Curve graph.

Figure 13B:
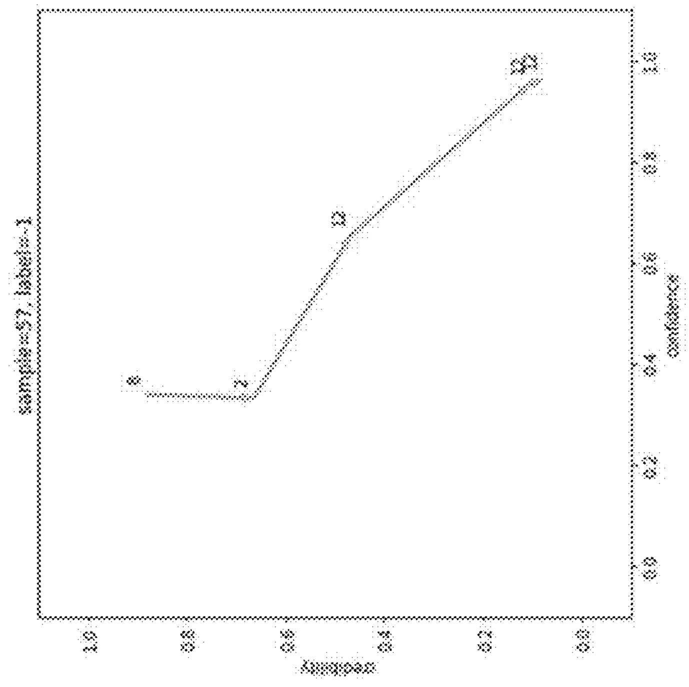
FIGS. 13*a* and 13*b* illustrate sample anomaly detection using graphs which plot credibility (y-axis) and confidence (x-axis) as calculated through AMA for the exemplified 5 layers.
Figure 13A:
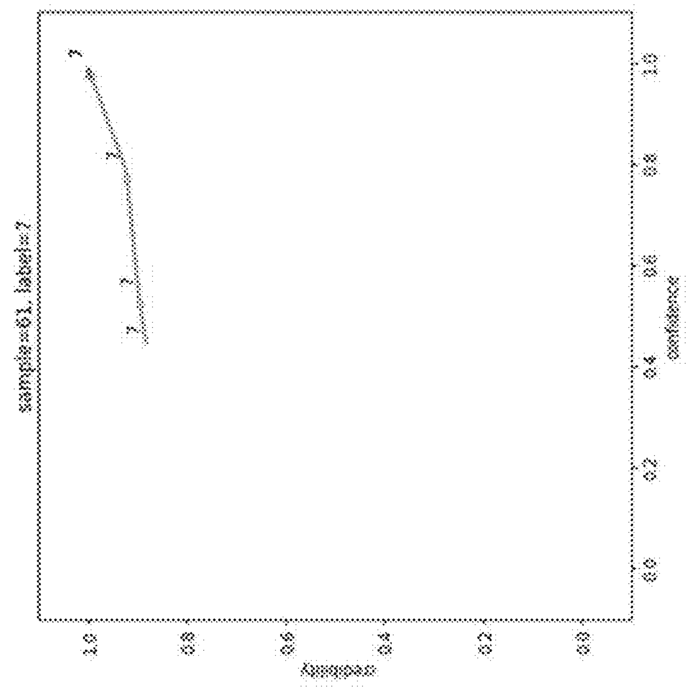

FIGS. 13*a* and 13*b* illustrate anomaly detection using graphs which plot credibility (y-axis) and confidence (x-axis) as calculated through AMA for the exemplified 5 layers. The graphs illustrate the prediction of a sample at each layer using hypervector representations as described herein. FIG. 13*a* illustrates the per-layer prediction labels of an in-domain sample as it progresses through the host network. In this example, AMA shows that the in-domain sample has consistent and correct prediction labels as it progresses through the host network with increasing credibility. In contrast, FIG. 13*b* illustrates the per-layer prediction labels of an out-domain sample. Here, AMA shows that the anomalous sample has inconsistent prediction labels as it progresses through the host network with decreasing credibility. These results provide a basis for additional detection and analytic processing of activation map techniques for XAI using HDC.

Further to the exemplary embodiment of FIGS. 4*a* and 4*b*, because the activation maps of the host CNN's earlier layers have more spatial information and have larger number of pixels than that of the later layers of the host network, the HDC encoding procedure is modified for the activation maps of the host CNN's earlier layers as discussed below. First, represent each activation map in the earlier layers as a Vector of Locally Aggregated Descriptors (VLAD), which is one type of GID. Then apply the HDC encoding process to the VLAD of each activation map instead of pixels.

Figure 14:
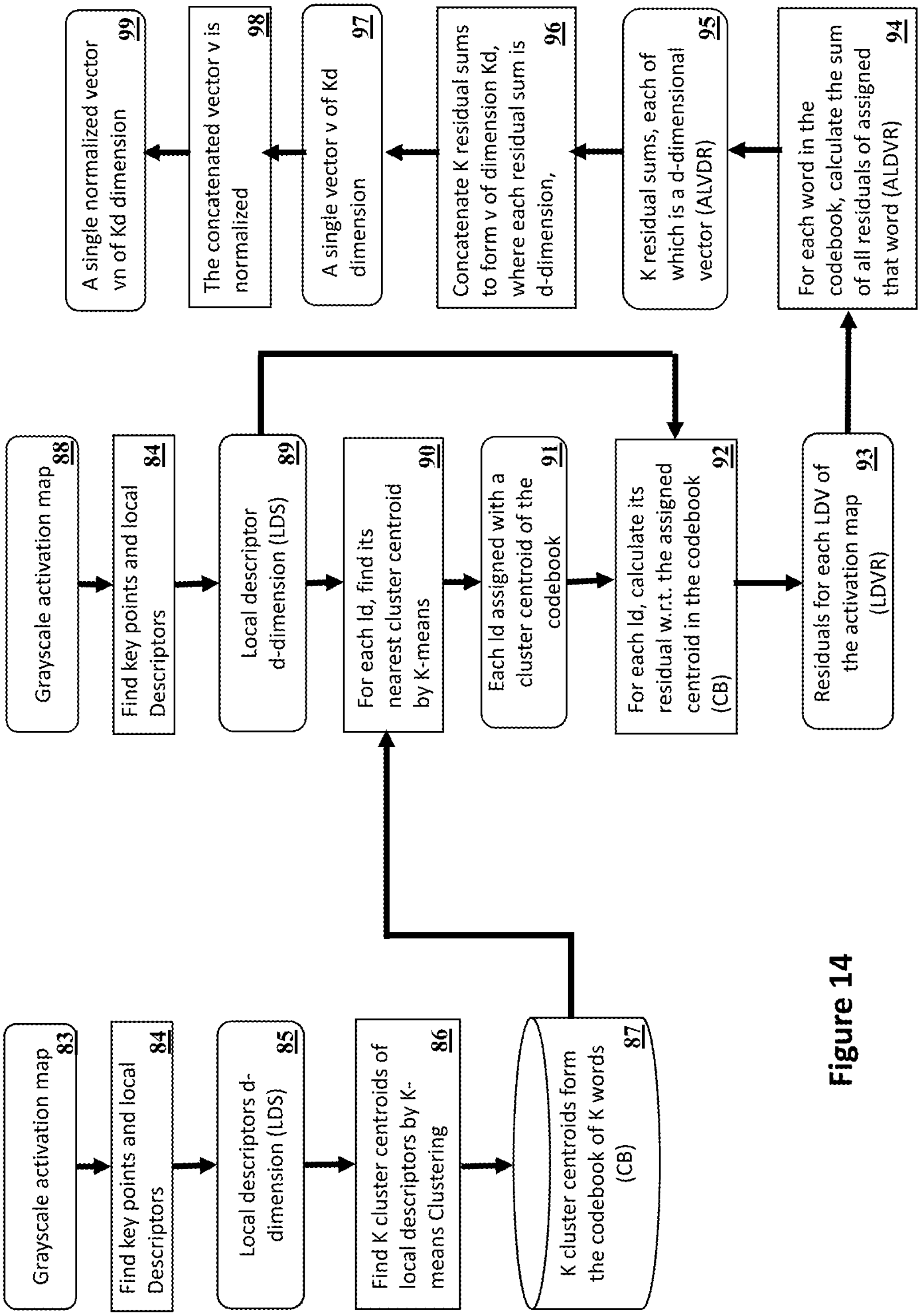
FIG. 14 exemplifies a system for the training and inferencing phases of encoding activation maps as Vectors of Locally Aggregated Descriptors (VLAD).

The Vector of Locally Aggregated Descriptors (VLAD) operation descriptions are shown in FIG. 14 for the activation maps of a given layer of the host network. The VLAD operations are performed in two phases: training phase and calibration/inferencing phase. The training phase is to create a codebook and is only performed once. The resulting codebook is stored on the hard drive. Suppose all input images to the host network are calibration images, $img_p$, where p is the input image index. The input of the VLAD in training phase, $am_{p,q,r}$, is a grayscale activation map 83, where q is the layer index of the host network, and r is the activation map index. The VLAD processing steps can be summarized as follows:

for each image $img_p$ in calibration set over all $p$ for each layer $layer_{p,q}$ in the host net over all $q$:

for each activation map $am_{p,q,r}$ in the layer over all $r$:

find all keypoints $kp_{p,q,r,s}$ over all $s$ for each keypoint $kp_{p,q,r,s}$ in the activation map over all $s$:

find the corresponding descriptor $ldpt_{p,q,r,s}$ (5)

In the more detailed operations of FIG. 14, apply a local descriptor algorithm 84, e.g. SIFT, SURF, or KAZE, to the input $am_{p,q,r}$, to the keypoints and descriptors of the find activation map, $LDPT_{p,q,r}=\{ldpt_{p,q,r,1}, ldpt_{p,q,r,2}, \ldots, ldpt_{p,q,r,s}, \ldots, ldpt_{p,q,r,s,n_s}\}$, where $ld_{p,q,r,s}$ is a local descriptor, s is the descriptor index, and $n_s$ is the number descriptors found in that activation map, $am_{p,q,r}$.

Repeat above operations of finding local descriptor over all calibration images $\{img_p: img_p \in X\}$ to form the set of all descriptors defined in Eq. (5), $LDS=\{LD_1, LD_2, \ldots, LD_p, \ldots, LD_M\}$ 85, where M is the number of images in the calibration set, and $LD_p=\{LDPT_{p,q,r,s}, \forall q,r,s\}$. By applying K-means clustering 86 to the set of LDS, K cluster centroids $\{c_1, c_2, \ldots, c_K\}$ (words) are produced and is stored on the hard drive 87, which form the codebook (CB). The codebook (CB) is retrieved and used in the next phase, calibration/inferencing.

In the inferencing phase, the input $am_{p,q,r}$ is a grayscale activation map 88. Apply the local descriptor algorithm chosen in the training phase 84 to the input $am_{p,q,r}$ to find the keypoints and descriptors of the activation map $LDPT_{p,q,r}=\{\{ldpt_{p,q,r,1}, ldpt_{p,q,r,2}, \ldots, ldpt_{p,q,r,s}, \ldots, ldpt_{p,q,r,n_s}\}\}$ 89 as in the training phase. For each descriptor $ldpt_{p,q,r,s} \in LDPT_{p,q,r}$ 89, assign it with the label of $c_j$, a cluster centroid from the CB 87 by nearest-neighbor clustering operation 90. All such pairs $(ldpt_{p,q,r,s}, c_1)$ form the resulting set $S=\{(ldpt_{p,q,r,s}, c_j): \forall p, rq, r, s, j \in \{1, 2, \ldots, K\}\}$ 91.

For simplicity, without the loss of generality, $ldpt_{p,q,r,s}$ is replaced by $ldpt_w$, and $S=\{(ldpt_w, c_j), \forall w, j \in \{1, 2, \ldots, K\}\}$. Next, calculate the residual of each pair in S 92, $$r_{w,j} = ldpt_w - c_j \tag{6}$$

and place in memory 93. These residuals are then used to calculate 94 the accumulation of the residuals (ALDVR) 95 as follows:

$$v_j = \sum_{w=1}^{n_i} r_{w,j} \tag{7}$$

There are K such accumulations of residual vectors, each of which is d-dimension. These K vectors are concatenated 96, as follows, $$v = [v_1, v_2, \ldots, v_j, \ldots, v_K]^T \tag{8}$$

to form a Kd-dimension vector v 97.

Next, normalize the concatenated vector of (8) according to Eq. (9) and (10) as follows:

$$vp = \text{sign}(v)\sqrt{|v|} \tag{9}$$

$$vn = \frac{vp}{\|vp\|} \tag{10}$$

to produce the normalized vector vn 99 which is the VLAD of the input activation map $am_{p,q,r,s}$.

The embodiments described and claimed herein are not to be limited in scope by the specific examples herein disclosed since these examples are intended as illustrations of several aspects of the embodiments. Any equivalent examples are intended to be within the scope of the embodiments. Indeed, various modifications of the embodiments in addition to those shown and described herein will become apparent to those skilled in the art from the foregoing description. Such modifications are also intended to fall within the scope of the appended claims. All references including patents, patent applications and publications cited herein are incorporated herein by reference in their entirety and for all purposes to the same extent as if each individual publication or patent or patent application was specifically and individually indicated to be incorporated by reference in its entirety for all purposes.

The invention claimed is:

1. A process for explaining deep neural network (DNN) decisions comprising:

attaching an activation map analysis (AMA) system to the DNN for employing a calibration process and an inferencing process, wherein the calibration process includes feeding the DNN a calibration dataset (C);

extracting, by an extraction module of the AMA system, baseline activation maps at each layer of the DNN for the calibration dataset, wherein the baseline activation maps are stored as activation map vectors;

reducing dimensionality of the activation map vectors using a hyperdimensional computing (HDC) reduction process, wherein the HDC reduction process encodes the activation map vectors of a single layer of the DNN into a single hypervector representing the layer;

calculating a calibration non-conformity for each element of the calibration dataset to determine a calibration non-conformity dataset (A); and the inferencing process includes feeding the DNN a query input (z) of dataset (Q);

extracting, by an extraction module of the AMA system, query activation maps at each layer of the DNN for the query dataset, wherein the query activation maps are stored as activation map vectors;

calculating a query non-conformity for each element of the query dataset to determine a query non-conformity dataset (B);

calculating by a specified-metric module a fraction value of the calibration non-conformity dataset that have higher non-conformity than a threshold established by the query non-conformity dataset, wherein the fraction value is used to determine at least one of a credibility score CS (z), a prediction label PL (z) and confidence CF (z) in one or more of the DNN decisions.

2. The process of claim 1, wherein calculating the calibration non-conformity and the query non-conformity to determine A and B includes:

finding K-nearest neighbor of each element in the calibration dataset (C) and the query dataset (Q), wherein x: $\Gamma=\{$K-nearest neighbors of x in the normal baseline$\}$, x being an input data point and $\Gamma$ being a set reminder and further wherein each element of $C=X\times Y$, is a 2-tuple, (x,y), $x\in X$ is the sample, and $y\in Y$ is its associated class label;

creating a label set for each x (a multi-set): $\Omega_\lambda=\{Y_i:i\in\Gamma\}$, where $\lambda$ is the layer index, and $Y_i$ is the class label for the i-th nearest neighbor; and calculating the calibration non-conformity, $a(x,y)=\Sigma_{\lambda\in 1\,.\,.\,.\,l}|i\in\Omega_\lambda:i\neq y|$ for each element of C, wherein $A=\{a(x,y):(x,y)\in C\}$ and the query non-conformity, $B=\{a(z,j)=\Sigma_{\lambda\in 1\,.\,.\,.\,l}|i\in\Omega_\lambda:i\neq j|:j\in 1\,.\,.\,.\,n\}$ for each element of Q, wherein l is a layer in the DNN, y is an output data point and n is a number of classes j.

3. The process of claim 1, wherein activation map vectors are encoded using a set of pre-computed binary HDC component vectors to generate hypervectors.

4. The process of claim 3, wherein the binary HDC component vectors represent different attributes of an activation map selected from a group consisting of pixel value, pixel position, and layer position within the DNN.

5. A process for determining DNN decision credibility comprising:

attaching an activation map analysis (AMA) system to the DNN for employing a calibration process and an inferencing process, wherein the calibration process includes feeding the DNN a calibration dataset (C);

extracting, by an extraction module of the AMA system, baseline activation maps of at least one layer of the DNN for the calibration dataset;

encoding the baseline activation maps using one or more binary hyperdimensional computing (HDC) component vectors to generate at least one calibration hypervector, wherein the baseline activation maps of a single layer are bundled into a single calibration hypervector representing the layer;

calculating a calibration non-conformity for each element of the calibration dataset, including the at least one calibration hypervector, to determine a calibration non-conformity dataset (A); and the inferencing process includes feeding the DNN a query input (z) of dataset (Q);

extracting, by an extraction module of the AMA system, query activation maps of at least one layer of the DNN for the query dataset;

encoding the query activation maps using one or more binary HDC component vectors to generate at least one query hypervector, wherein the query activation maps of a single layer are bundled into a single query hypervector representing the layer;

calculating a query non-conformity for each element of the query dataset, including the at least one query hypervector, to determine a query non-conformity dataset (B);

calculating by a specified-metric module a fraction value of the calibration non-conformity dataset that have higher non-conformity than a threshold established by the query non-conformity dataset, wherein the fraction value is used to determine a credibility score CS (z) for the DNN decision.

6. The process of claim 5, wherein baseline activation maps and query activation maps are extracted for a set of layers of the DNN and the extracted baseline and query activation maps are each encoded using one or more binary HDC component vectors to generate multiple calibration and query hypervectors.

7. The process of claim 6, wherein baseline activation maps and query activation maps are extracted for all layers of the DNN and are each encoded using one or more binary HDC component vectors to generate calibration and query hypervectors.

8. The process of claim 5, wherein the one or more binary HDC component vectors represent different attributes of an activation map selected from a group consisting of pixel value, pixel position, and layer position within the DNN.

9. The process of claim 5, wherein calculating the calibration non-conformity and the query non-conformity to determine A and B includes:

finding K-nearest neighbor of each element in the calibration dataset (C) and the query dataset (Q), wherein x:$\Gamma=\{$K-nearest neighbors of x in the normal baseline$\}$, x being an input data point and $\Gamma$ being a set identifier and further wherein each element of $C=X\times Y$, is a 2-tuple, (x,y), $x\in X$ is the sample, and $y\in Y$ is its associated class label;

creating a label set for each x (a multi-set): $\Omega_\lambda=\{Y_i:i\in\Gamma\}$, where $\lambda$ is the layer index, and $Y_i$ is the class label for the i-th nearest neighbor; and calculating the calibration non-conformity, $a(x,y)=\Sigma_{\lambda\in 1\,.\,.\,.\,l}|i\in\Omega_\lambda:i\neq y|$ for each element of C, wherein $A=\{a(x,y):(x,y)\in C\}$ and the query non-conformity, $B=\{a(z,j)=\Sigma_{\lambda\in 1\,.\,.\,.\,l}|i\in\Omega_\lambda:i\neq j|:j\in 1\,.\,.\,.\,n\}$ for each element of Q wherein l is a layer in the DNN, y is an output data point and n is a number of classes j.

10. The process according to claim 5, wherein prior to encoding, the baseline activation maps and query activation maps are pre-processed to produce one or more feature vectors, wherein the one or more feature vectors are encoded using one or more binary HDC component vectors to generate one or more hypervectors.

11. The process according to claim 5, wherein prior to encoding, the baseline activation maps and query activation maps are pre-processed to produce one or more global image descriptors, wherein the one or more global image descriptors are encoded using one or more binary HDC component vectors to generate one or more hypervectors.

12. A system for explaining deep neural network (DNN) decisions comprising:

at least one processor including a host network programmed thereon for deploying a deep neural network (DNN); and an activation map analysis toolkit including an extraction module, a dimension reduction module and a non-conformity module, wherein the extraction module is configured to extract one or more baseline activation maps and one or more query activation maps within at least one layer of the DNN, wherein the dimension reduction module is a hyperdimensional computing (HDC) module configured to encode the one or more baseline activation maps of a single layer of the DNN into a single calibration hypervector representing the layer and encode the one or more query activation maps of the single layer of the DNN into a single query hypervector representing the layer, and wherein the non-conformity module is configured to calculate one or more non-conformity values for the extracted one or more query activation maps;

wherein the activation map analysis toolkit communicates with the host network to output use-case specific metrics which explain DNN decisions.

13. The system of claim 12, wherein the activation map analysis toolkit further includes code for determining locality-sensitive hashing (LSH) similarity distance.

14. The system of claim 12, wherein the activation map analysis toolkit further includes a calibration data set.

15. The system of claim 12, wherein the non-conformity module includes code for performing k-nearest neighbors determinations.

16. The system of claim 12, wherein the DNN is a convolutional neural network (CNN).

* * * * *